US012764350B2

(12) United States Patent
Chen et al.

(10) Patent No.: US 12,764,350 B2
(45) Date of Patent: Oct. 13, 2026

(54) VIDEO FRAME EXTRACTION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Peng Chen, Shenzhen (CN); Guohui Zheng, Shenzhen (CN); Qiufeng Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/181,721

(22) Filed: Apr. 17, 2025

(65) Prior Publication Data

US 2026/0164070 A1 Jun. 11, 2026

Related U.S. Application Data

(63) Continuation of application No. PCT/CN2024/078352, filed on Feb. 23, 2024.

(30) Foreign Application Priority Data

Apr. 13, 2023 (CN) ......................... 202310436197.2

(51) Int. Cl.
*G06F 16/78* (2019.01)
*H04N 21/231* (2011.01)
(Continued)

(52) U.S. Cl.
CPC ....... *H04N 21/232* (2013.01); *G06F 16/7867* (2019.01); *H04N 21/23106* (2013.01); *H04N 21/2387* (2013.01); *H04N 21/2743* (2013.01)

(58) Field of Classification Search
CPC ........................... G06F 16/248; G06F 16/3329
(Continued)

(56) References Cited

U.S. PATENT DOCUMENTS

2003/0122922 A1* 7/2003 Saffer ................ H04N 21/2743 348/14.09
2013/0083210 A1* 4/2013 Beckham ....... H04N 21/440218 348/207.11
(Continued)

FOREIGN PATENT DOCUMENTS

CN 109672902 A 4/2019
CN 113286171 A 8/2021
(Continued)

OTHER PUBLICATIONS

The World Intellectual Property Organization (WIPO) International Search Report for PCT/CN2024/078352 Jun. 4, 2024 7 Pages (including translation).
(Continued)

*Primary Examiner* — Cam Y T Truong
(74) *Attorney, Agent, or Firm* — Anova Law Group, PLLC

(57) ABSTRACT

A video frame extraction method includes uploading a video through an online access link and locally caching the video to a local database; generating a local access link of the video according to the online access link that includes a local cache identifier and a local video identifier; in response to a video frame extraction request for the video, obtaining a playback time of target video frame of the video for extracting and triggering an access request and carrying the playback time of target video frame; forwarding the access request to the local database in response to identifying the local cache identifier from the local access link, to enable the local database to return a locally cached video that matches based on the local video identifier; and obtaining the locally
(Continued)

cached video returned by the local database and extracting a video frame matching the playback time of target video frame.

18 Claims, 11 Drawing Sheets

(51) Int. Cl.

| | |
|---|---|
| ***H04N 21/232*** | (2011.01) |
| ***H04N 21/2387*** | (2011.01) |
| ***H04N 21/2743*** | (2011.01) |

(58) Field of Classification Search
USPC .......................................................... 707/758
See application file for complete search history.

(56) References Cited

U.S. PATENT DOCUMENTS

| | | | |
|---|---|---|---|
| 2015/0281710 | A1 | 10/2015 | Sievert et al. |
| 2017/0164027 | A1 | 6/2017 | Zhang |
| 2019/0124411 | A1 | 4/2019 | Surcouf et al. |
| 2023/0186452 | A1 | 6/2023 | Fu et al. |

FOREIGN PATENT DOCUMENTS

| | | | |
|---|---|---|---|
| CN | 114205678 | A | 3/2022 |
| CN | 114339400 | A | 4/2022 |
| WO | 2021227531 | A1 | 11/2021 |

OTHER PUBLICATIONS

The European Patent Office (EPO) The Extended European Search Report for Application No. 24787817.6 Jul. 1, 2026 11 Pages.

* cited by examiner

VIDEO FRAME EXTRACTION METHOD, COMPUTER DEVICE, AND STORAGE MEDIUM

CROSS-REFERENCES TO RELATED APPLICATIONS

This application is a continuation application of PCT Patent Application No. PCT/CN 2024/078352, filed on Feb. 23, 2024, which claims priority to Chinese Patent Application No. 2023104361972, filed on Apr. 13, 2023, all of which is incorporated herein by reference in their entirety.

FIELD OF THE TECHNOLOGY

The present disclosure relates to the field of computer technologies and, in particular, to a video frame extraction method, apparatus, computer device, storage medium, and computer program product, and a video preview interaction method, apparatus, computer device, storage medium, and computer program product.

BACKGROUND OF THE DISCLOSURE

With the development of Internet technologies, many publishers release their video content on major video platforms every day. In a process of publishing the video content, the publisher usually selects a video frame from the video content as the cover. Therefore, it is often necessary to extract video frames from the video.

Extracting a video frame from a video may involve: uploading the video to the video platform server on the frontend and extracting video frames by accessing the video link provided by the video platform server. returned However, the time required to access video resources on the video platform server through the video link is generally long, leading to issues with unsmooth video frame extraction.

SUMMARY

One embodiment of the present disclosure provides a video frame extraction method, executed by a computer device. The method includes uploading a video through an online access link, and locally caching the video to a local database; generating a local access link of the video according to the online access link, the local access link comprising a local cache identifier and a local video identifier pointing to the video cached in the local database; in response to a video frame extraction request for the video, obtaining a playback time of target video frame of the video and triggering an access request, the access request instructing to access the local access link and carrying the playback time of target video frame; forwarding the access request to the local database in response to identifying the local cache identifier from the local access link instructed by the access request to access, to enable the local database to return, in response to the access request, a locally cached video that matches based on the local video identifier; and obtaining the locally cached video returned by the local database and extracting a video frame matching the playback time of target video frame from the locally cached video.

Another embodiment of the present disclosure provides a computer device. The computer device includes one or more processors and a memory containing a computer program that, when being executed, causes the one or more processors to perform uploading a video through an online access link, and locally caching the video to a local database; generating a local access link of the video according to the online access link, the local access link comprising a local cache identifier and a local video identifier pointing to the video cached in the local database; in response to a video frame extraction request for the video, obtaining a playback time of target video frame of the video and triggering an access request, the access request instructing to access the local access link and carrying the playback time of target video frame; forwarding the access request to the local database in response to identifying the local cache identifier from the local access link instructed by the access request to access, to enable the local database to return, in response to the access request, a locally cached video that matches based on the local video identifier; and obtaining the locally cached video returned by the local database and extracting a video frame matching the playback time of target video frame from the locally cached video.

Another embodiment of the present disclosure provides a non-transitory computer-readable storage medium containing a computer program that, when being executed, causes at least one processor to perform: uploading a video through an online access link, and locally caching the video to a local database; generating a local access link of the video according to the online access link, the local access link comprising a local cache identifier and a local video identifier pointing to the video cached in the local database; in response to a video frame extraction request for the video, obtaining a playback time of target video frame of the video and triggering an access request, the access request instructing to access the local access link and carrying the playback time of target video frame; forwarding the access request to the local database in response to identifying the local cache identifier from the local access link instructed by the access request to access, to enable the local database to return, in response to the access request, a locally cached video that matches based on the local video identifier; and obtaining the locally cached video returned by the local database and extracting a video frame matching the playback time of target video frame from the locally cached video.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions in the embodiments of the present disclosure or the related technology more clearly, the following briefly describes the drawings required for describing the embodiments or the related technology. Apparently, the drawings in the following descriptions show merely embodiments of the present disclosure, and a person of ordinary skill in the art may alternatively obtain other drawings according to the disclosed drawings without creative efforts.

DESCRIPTION OF EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
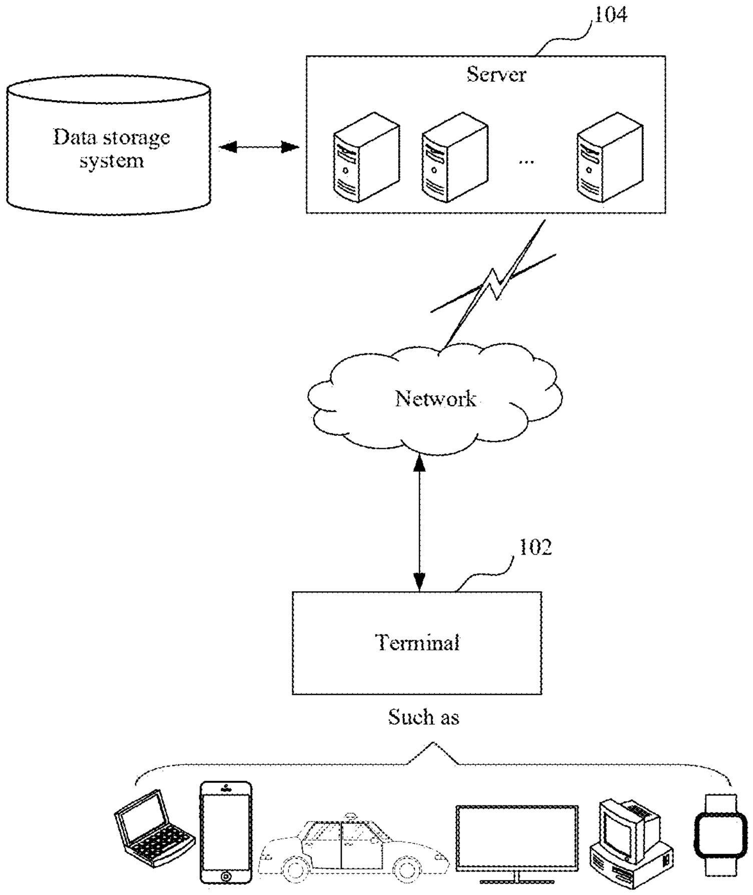
FIG. 1 is a diagram of an application environment of a video frame extraction method according to an embodiment of the present disclosure.

A video frame extraction method according to an embodiment of the present disclosure may be applied to an application environment shown in FIG. 1. A terminal 102 communicates with a server 104 through a network. A data storage system may store data that needs to be processed by the server 104. The data storage system may be integrated on the server 104, or may be placed on a cloud or another server. A client configured to implement extracting a video frame is installed on the terminal 102. The client may be an application, may be a web client, or may be a child application that runs in a running environment of a parent application. The terminal 102 uploads a video through an online access link provided by the server 104, locally caches the video to a local database, generates a local access link of the video according to the online access link, the local access link including a local cache identifier and a local video identifier pointing to the video cached in the local database, obtains a playback time of target video frame (e.g., a to-be-extracted video frame playback time) of the video for extracting in response to a video frame extraction request for the video, triggers an access request, the access request instructing to access the local access link and carrying the playback time of target video frame for extracting, forwards the access request to the local database in response to identifying the local cache identifier from the local access link that the access request instructs to access, obtains a locally cached video returned by the local database in response to the access request, and extracts a video frame matching the playback time of target video frame for extracting from the locally cached video. The terminal 102 may be, but is not limited to, various desktop computers, notebook computers, smartphones, tablet computers, Internet of Things devices, and portable wearable devices. The Internet of Things devices may be smart speakers, smart televisions, smart air conditioners, smart in-vehicle devices, and the like. The portable wearable devices may be smart watches, smart bracelets, head-mounted devices, and the like. The server 104 may be implemented by using an independent server or a server cluster including a plurality of servers, or may be a node on a blockchain.

Figure 2:
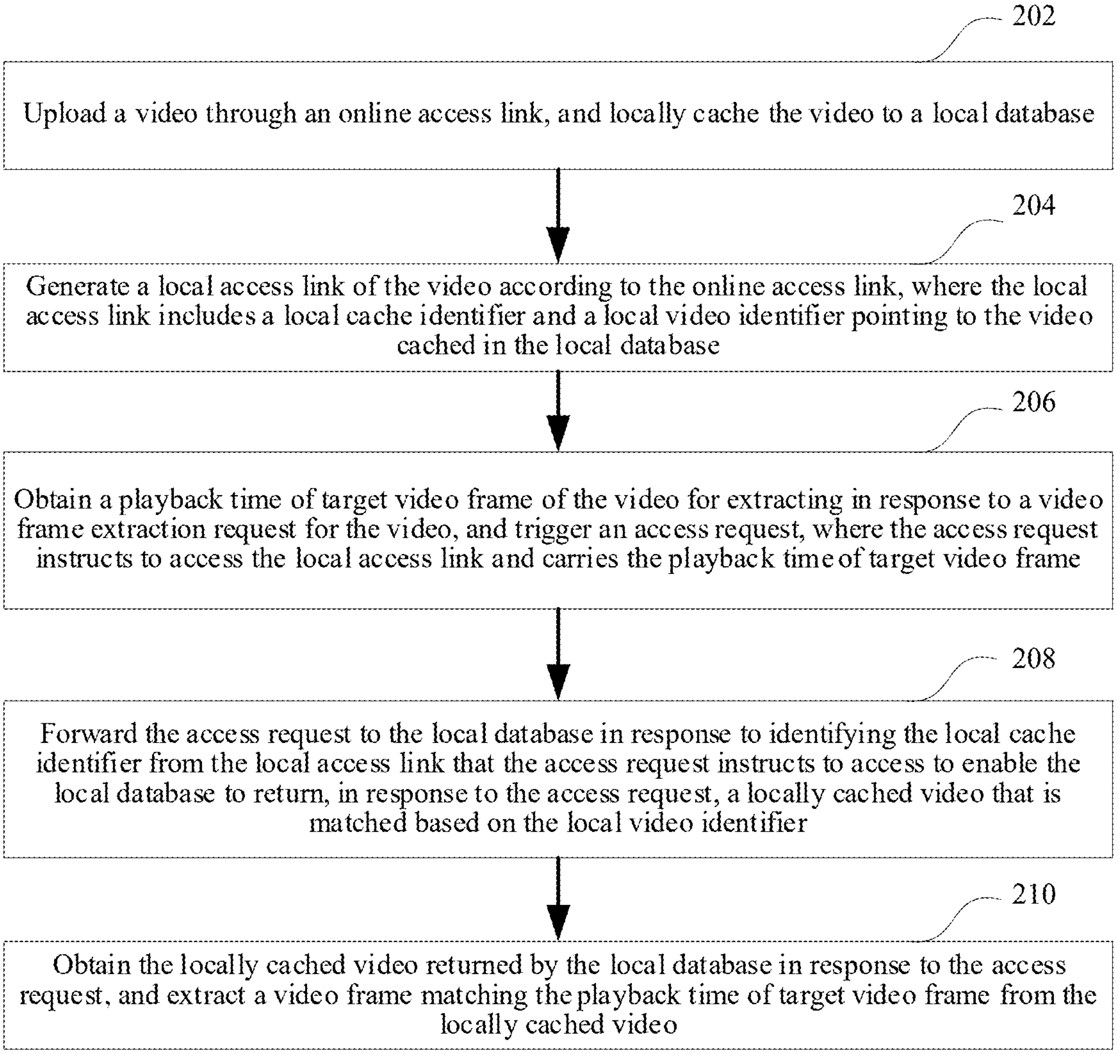
FIG. 2 is a schematic flowchart of a video frame extraction method according to an embodiment of the present disclosure.

In an embodiment, as shown in FIG. 2, a video frame extraction method is provided. The method may be performed by a terminal or a server independently, or may be jointly performed by a terminal and a server. In this embodiment of the present disclosure, an example in which the method is applied to a terminal is used for description. The method includes the following operations.

Operation 202: Upload a video through an online access link, and locally cache the video to a local database.

The online access link refers to an online accessible link that can be configured for uploading the video. The video relates to various technologies for capturing, recording, processing, storing, transmitting, and reproducing a series of static images in a mode of an electrical signal. When continuous images change more than 24 frames of images per second, according to a principle of persistence of vision, human eyes cannot distinguish a single static image, and a visual effect seems to be a smooth and continuous visual effect. Such continuous images are referred to as a video. A type of a to-be-uploaded video is not limited in this embodiment. For example, the to-be-uploaded video may be a video clip shot by a video uploader. For another example, the to-be-loaded video may be a film and television clip clipped by a video uploader. Uploading the video through the online access link may be specifically opening a web page to which the online access link points in a browser, and uploading the video in the web page, or opening an online folder through the online access link in a resource manager, and uploading the video to the online folder.

The local database is a database configured to locally cache data in the terminal. For example, the local database may be specifically an IndexedDB (a local database provided by a browser installed in a terminal). The local database may be created and operated by a web page script, allows to store a large amount of data, provides a search interface, and can further establish an index. In terms of a database type, the local database does not belong to a relational database, and does not support a structured query language database (SQL) query statement. An object store is employed for storing data in the IndexedDB. All types of data may be directly stored, including a JavaScript object. In the object store, data is stored in a form of a "key-value pair". Each data record has a corresponding primary key. The primary key is unique and cannot be repeated. Otherwise, an error is reported.

Specifically, the terminal may upload the video through the online access link, and locally cache the video to the local database. In a specific application, the terminal displays a video upload page corresponding to the online access link. In response to a video uploading operation triggered on the video upload page by a video uploader, the terminal uploads a local video through the online access link, and locally caches the video to the local database. In a specific application, the terminal may upload the video to a video platform server by invoking a video upload software development kit (SDK).

In a specific application, when the video is uploaded through the online access link, the terminal may obtain a source file of the video, so as to generate a local video identifier of the video based on the source file of the video, and cache the video to the local database by using the local video identifier. In a specific application, the local database stores the video by using the object store, data in the object store is stored in a form of the "key-value pair", and the primary key corresponding to the video is the local video identifier.

Operation 204: Generate a local access link of the video according to the online access link, where the local access link includes a local cache identifier and a local video identifier pointing to the video cached in the local database.

The local access link refers to a link that is homologous to the online access link and that may be configured for accessing the video cached in the local database. The homologous herein means that the local access link and the online access link have the same network protocol, host address and port. The network protocol refers to a set of rules that peer entities communicating with each other in a computer network have to comply with when exchanging information. For example, common network protocols include a hyper text transfer protocol (HTTP), a hypertext transfer protocol secure (HTTPS), and the like. The host address is an address configured for uniquely identifying each host or device in a transmission control protocol (TCP)/Internet protocol (IP) network, and the host address includes a 32-bit (four octets in total) binary system. The port refers to a port in a logical sense, and generally refers to a port in a TCP/IP protocol. Port numbers range from 0 to 65535. Common ports include a port 80 configured to browse a web page service, a port 21 configured to for a file transfer protocol (FTP) service, and the like.

The local cache identifier refers to a mark configured for identifying the local access link, and a video link is the local access link provided that the local cache identifier exists in the video link. The local video identifier refers to a mark configured for identifying the video, and is configured for uniquely marking and identifying the video. For example, the local video identifier may be specifically a hash value of a video obtained through a hash algorithm. For example, assuming that the online access link is https://A.com/B, the generated local access link may be https://A.com/localCache/C, where localCache is a local cache identifier, and C is a local video identifier.

Specifically, the terminal parses the online access link, determines a link parameter required for a homologous link of the online access link, and then generates the local access link of the video based on the link parameter required for the homologous link, the local cache identifier configured for identifying the local access link, and the local video identifier of the video. The local access link includes the local cache identifier and the local video identifier pointing to the video cached in the local database.

Operation 206: Obtain a playback time of target video frame of the video for extracting in response to a video frame extraction request for the video, and trigger an access request, where the access request instructs to access the local access link and carries the playback time of target video frame.

The video frame extraction request refers to an event of extracting at least one video frame from a video. The playback time of target video frame refers to a playback time of a video frame that needs to be extracted in the video. For example, when a first video frame is extracted, the playback time of target video frame may be a 0th second of the video. The access request is configured for accessing the local access link and reading the locally cached video in the local database, to extract a video frame matching the playback time of target video frame from the locally cached video. Extracting a video frame from a video may be referred to as frame extraction.

Specifically, the terminal monitors the video frame extraction request for the video in real time, obtains the playback time of target video frame of the video in response to the video frame extraction request for the video when the video frame extraction request for the video is monitored, and triggers the access request instructing to access the local access link and carrying the playback time of target video frame.

In a specific application, the video frame extraction request for the video may be automatically triggered after the video is loaded. In a specific application, after generating the local access link of the video according to the online access link, the terminal returns the generated local access link through a video tag of the video, starts to monitor a loaded event of the video based on the video tag, and automatically triggers the video frame extraction request for the video when the loaded event of the video is monitored. When the video frame extraction request for the video is automatically triggered, the playback time of target video frame indicated by the video frame extraction request may be configured according to an actual application scenario. For example, the playback time of target video frame indicated by the video frame extraction request may be 0 s, and the automatically triggered video frame extraction request for the video refers to extracting a first video frame from the video.

In a specific application, the video tag is configured for embedding a video element in a page. For example, the video tag may be specifically a video tag. The video tag is a newly added tag in hypertext markup language 5(HTML 5), and has a function of embedding a video element in an HTML page. The terminal uses the local access link as a uniform resource locator (URL) of a to-be-played video in the video tag of the video to return the generated local access link through the video tag of the video.

In a specific application, the loaded event may be specifically a loadeddata event. When the loadeddata event is monitored, the video is loaded in a memory. When data of a current frame is loaded, but there is not enough data to play a next frame of a specified video, the loadeddata event occurs. In this embodiment, an addEventListener ( ) method may be used to implement monitoring of the loadeddata event.

In a specific application, the video frame extraction request for the video may be triggered after a video uploader sets a playback time of target video frame. In a specific application, after generating the local access link of the video according to the online access link, the terminal returns the generated local access link through the video tag of the video, and starts to monitor a loaded event of the video based on the video tag. When the loaded event of the video is monitored, video frame extraction may be performed, the terminal continues to monitor a playback time of target video frame setting event for the video, and triggers the video frame extraction request for the video when the playback time of target video frame setting event for the video is monitored.

In a specific application, after the playback time of target video frame setting event for the video is monitored, the terminal sets a playback time of the video to the playback time of target video frame in response to the playback time of target video frame setting event for the video, and monitors the playback time setting event. After the playback time setting event is monitored, the playback time of the video is set to the playback time of target video frame, and the video frame extraction request for the video is triggered in response to the playback time setting event.

In a specific application, the playback time of target video frame setting event may be specifically a seeked event. When a seeked event is monitored, the playback time of the video has set to the playback time of target video frame. The seeked event is triggered when a user has already moved/skipped to a new location in the video. In this embodiment, an addEventListener ( ) method may be used to implement monitoring of the seeked event.

In a specific application, the terminal may extract a video frame matching the playback time of target video frame by using a canvas tag in response to the video frame extraction request for the video. In a specific application, in response to the video frame extraction request for the video, the terminal creates, based on the canvas tag, a canvas object configured to draw an extracted video frame, reads the video tag of the video through the canvas object to obtain the playback time of target video frame of the video, initiates an access request instructing to access a local access link and carrying the playback time of target video frame to obtain the extracted video frame, and draws the extracted video frame on a canvas to implement extraction of the extracted video frame.

In a specific application, the canvas tag may specifically refer to a Canvas tag. The Canvas tag is a newly added tag in HTML5, is configured for generating an image on a web page in real time, and may operate image content. Essentially, the Canvas tag is a bitmap that can be operated by using JavaScript. The Canvas object may specifically refer to a Canvas object. The Canvas object represents an HTML Canvas element-<canvas>. The Canvas object does not have a behavior, but defines an interface to support a scripting client drawing operation. A width and a height, that is, a size of the canvas, may be directly specified on the Canvas object. Most functions of the Canvas object may be obtained through a CanvasRenderingContext2D object, which is obtained by a getContext ( ) method of the Canvas object and passing a literal character string “2d” to the Canvas object as a unique parameter.

In a specific application, the extracted video frame may be drawn on the canvas object by a drawImage method. The used drawImage method may be specifically context-.drawImage (video, dx, dy, canvas.width, canvas.height), where video is the video tag of the video, dx and dy are a location of drawing the extracted video frame on the canvas, canvas.width is a canvas width, and canvas.height is a canvas height. The location of drawing the extracted video frame on the canvas, the canvas width, and the canvas height may all be configured according to an actual application scenario. In a specific application, the canvas width may be the same as a video width in the video tag, and the canvas height may be the same as a video height in the video tag.

Operation 208: Forward the access request to the local database in response to identifying the local cache identifier from the local access link that the access request instructs to access, to enable the local database to return, in response to the access request, a locally cached video that is matched based on the local video identifier.

Specifically, the terminal intercepts and identifies the access request. In response to identifying the local cache identifier in the local access link that the access request instructs to access, the access request actually indicates to read the cached video from the local database, and the terminal forwards the access request to the local database.

Operation 210: Obtain the locally cached video returned by the local database in response to the access request, and extract a video frame matching the playback time of target video frame from the locally cached video.

Specifically, after receiving the access request, the local database parses the access request, determines the local video identifier in the local access link in the access request, and feeds back the locally cached video matching the local video identifier. The terminal obtains the locally cached video returned by the local database in response to the access request, and extracts the video frame matching the playback time of target video frame from the locally cached video. The locally cached video refers to the video cached in the local database.

According to the foregoing video frame extraction method, a video is uploaded through an online access link, the video is locally cached to a local database, and a local access link, including a local cache identifier and a local video identifier pointing to the video cached in the local database, of the video is generated according to the online access link, so that the local access link for the video can be constructed. Therefore, when a playback time of target video frame of the video is obtained in response to a video frame extraction request for the video, an access request instructing to access the local access link and carrying the video frame extraction request is triggered, and the local cache identifier in the local access link that the access request instructs to access is identified, the access request is forwarded to the local database to obtain the locally cached video returned by the local database in response to the access request, and a video frame matching the playback time of target video frame is extracted from the locally cached video, a closed loop in which the video is uploaded and is opened through the local access link for video frame extraction is implemented, a time from obtaining to extracting the video frame is shortened, and the video frame can be extracted smoothly.

Through the video frame extraction method provided in the present disclosure, at a functional level, a requirement of extracting any video frame by a video uploader may be fully met, and at an experience level, the video frame is extracted very quickly and smoothly, after triggering the video frame extraction request by the video uploader, an extracted video frame is displayed almost immediately.

In an embodiment, the generating a local access link of the video according to the online access link includes:

- obtaining a local cache identifier, a local video identifier of the video, and a link parameter of the online access link; and generating the local access link of the video according to the local cache identifier, the local video identifier, and the link parameter.

The local cache identifier refers to a mark configured for identifying the local access link, and a video link is the local access link provided that the local cache identifier exists in the video link, which may be configured according to an actual application scenario. For example, the local cache identifier may be specifically a pre-configured character string. For example, the local cache identifier may be specifically a localCache. The local video identifier refers to a mark configured for identifying the video, and is configured for uniquely marking and identifying the video. For example, the local video identifier may be specifically a hash value of a video obtained through a hash algorithm. The link parameter refers to an attribute required by a homologous link of the online access link, and includes a network protocol, a host address, and a port of the online access link.

Specifically, the terminal obtains the local cache identifier configured for identifying the local access link, the local video identifier of the video, and the link parameter of the online access link, and generates the local access link of the video according to the local cache identifier, the local video identifier, and the link parameter and with reference to a link form of the online access link. In a specific application, referring to the link form of the online access link, a form of the generated local access link of the video may be: a network protocol/a host address/a local cache identifier/a local video identifier. For example, when the network protocol is https, the host address is A.com, the local cache identifier is localCache, and the local video identifier is C, the generated local access link of the video may be https://A.com/localCache/C.

In this embodiment, the local cache identifier, the local video identifier of the video, and the link parameter of the online access link are obtained, so that the local access link of the video can be constructed by using the local cache identifier, the local video identifier, and the link parameter.

In some embodiments, the video frame extraction method further includes:

a service worker thread is started, where the service worker thread is configured for intercepting and identifying an access request; and the forwarding the access request to the local database in response to identifying the local cache identifier from the local access link that the access request instructs to access includes:

the service worker thread forwards the access request to the local database in response to identifying the local cache identifier from the local access link that the access request instructs to access.

The service worker thread is a thread similar to a proxy server in a browser, and can intercept an outgoing request and cache a response. In this way, a web page to be normally used without a network connection because some or all pages may provide services from cache of the service worker thread.

Specifically, the terminal obtains a service worker file, and loads the service worker file to start the service worker thread. The service worker thread is mainly configured for intercepting and identifying the access request, equivalent to a function of the proxy server. After the access request instructing to access the local access link and carrying the playback time of target video frame is triggered, the service worker thread may intercept and identify the access request. In response to identifying the local cache identifier from the local access link that the access request instructs to access, the access request actually instructs to read the cached video from the local database, and the service worker thread forwards the access request to the local database.

In a specific application, when the service worker thread is started, the local access link of the video may alternatively be constructed by the service worker thread. Therefore, the access request may be intercepted and identified by using the service worker thread.

In this embodiment, the service worker thread is started, and the access request can be intercepted and identified by using the service worker thread, so that the access request may be forwarded to the local database to implement local access when the local cache identifier in the local access link that the access request instructs to access is identified.

In an embodiment, the uploading a video through the online access link, and locally caching the video to a local database includes:

uploading the video through the online access link, and obtaining video information of the video;

the transcoding the video to obtain a transcoded video when it is determined, according to the video information, that a video format of the video does not satisfy a video caching condition, where the video format of the transcoded video satisfies the video caching condition; and locally caching the transcoded video to the local database.

The video information is information configured for describing the video, and includes an encoding format, an encapsulation format, and the like of the video. The video format includes the encoding format and the encapsulation format of the video. The video caching condition is a condition of directly locally caching the video to the local database, and may be configured according to an actual application scenario. For example, the video caching condition may be specifically that only a video with a specific encoding and specific format may be cached in the local database. For example, the specific encoding may be H.264 (digital video compression format) encoding, and the specific format may be a moving picture experts group 4(MP 4) format.

Specifically, when uploading the video through the online access link, the terminal may obtain a source file of the video, so as to obtain the video information of the video by parsing the source file of the video. After obtaining the video information of the video, the terminal determines, according to the video information, whether the video format of the video satisfies the video caching condition. When it is determined, according to the video information, that the video format of the video does not satisfy the video caching condition, the terminal transcodes the video through a preloaded video transcoding tool to obtain a transcoded video with the video format satisfying the video caching condition, and locally caches the transcoded video to the local database.

In a specific application, the terminal may parse the source file of the video through a video parameter detection tool to obtain the video information of the video. The video parameter detection tool may be configured according to an actual application scenario. If it is determined, according to the video information, that the video format of the video satisfies the video caching condition, the terminal may directly locally cache the video to the local database without transcoding.

In this embodiment, when uploading the video through the online access link, the video information of the video may be obtained, so that the video may be transcoded when it is determined, according to the video information, that the video format of the video does not satisfy the video caching condition, to obtain the transcoded video with the video format satisfying the video caching condition, and then the transcoded video is locally cached to the local database. In the entire process, the uploaded video can be locally cached.

In some embodiments, the video frame extraction method further includes:

a web worker thread is started;

a video transcoding tool is loaded through the web worker thread; and the transcoding the video to obtain a transcoded video when it is determined, according to the video information, that a video format of the video does not satisfy a video caching condition includes:

transcoding the video through the video transcoding tool to obtain the transcoded video when it is determined, according to the video information, that the video format of the video does not satisfy the video caching condition.

A web (world wide web) worker is a part of a HTML5 standard. This specification defines a set of interfaces, which allows us to open a new worker thread beyond a JavaScript main thread of a browser, runs a JavaScript script therein, and endows a developer with a capability of operating a plurality of threads by using JavaScript. The web worker thread is an independent thread, and can run simultaneously with the JavaScript main thread without blocking each other. Therefore, when there are a large quantity of computing tasks, the computing tasks may be handed over to the web worker thread for processing, and when the web worker thread completes computing, a result is returned to the main thread of JavaScript of the browser. In this way, the JavaScript main thread of the browser processes service logic exclusively, and does not need to spend too much time in processing a large amount of complex calculation, thereby shortening blocking time, improving running efficiency, and naturally improving page smoothness and user experience.

Specifically, when entering a video upload page corresponding to the online access link, the terminal obtains a web worker file, asynchronously loads the web worker file to start the web worker thread, obtains a file configured for loading a video transcoding tool when the web worker thread is started, and loads the video transcoding tool by using the file configured for loading the video transcoding tool. When the video transcoding tool is loaded, when it is determined, according to the video information, that the video format of the video does not satisfy the video caching condition, the video transcoding tool is invoked, and the video is transcoded through the video transcoding tool, to obtain the transcoded video.

In a specific application, the file configured for loading the video transcoding tool may be specifically a web assembly file, and the video transcoding tool providing a video transcoding capability may be loaded through the web assembly file. The web assembly is a virtual instruction set architecture (virtual ISA). An overall architecture includes core ISA definition, binary encoding, definition and execution of program semantics, and an application programming interface (Web AssemblyAPI) orienting different embedding environments (such as Web). An initial objective of the architecture is to better run a program programmed by languages such as C/C++ on a web platform through compiling while ensuring security and approaching running speed of native applications.

Figure 3:
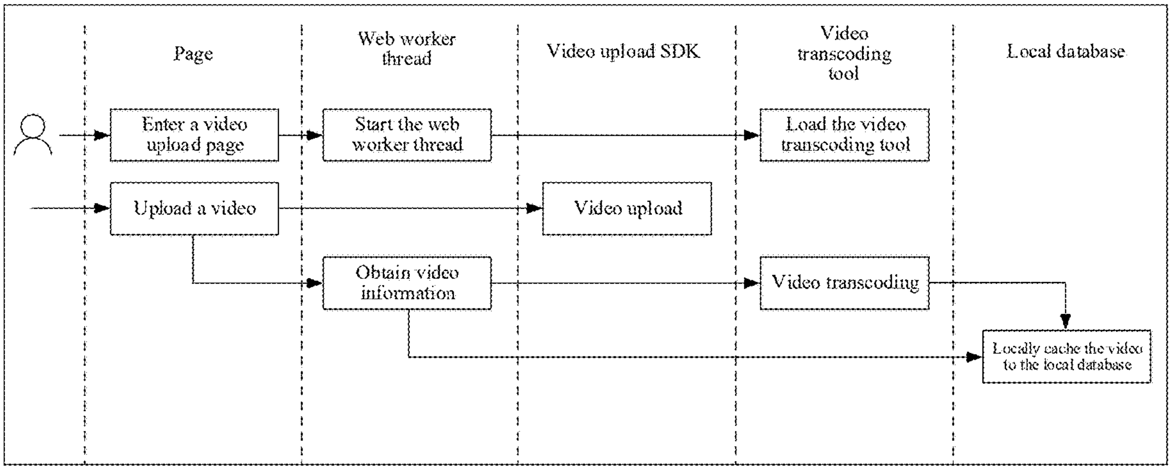
FIG. 3 is a schematic diagram of caching a video to a local database according to an embodiment of the present disclosure.

In a specific application, as shown in FIG. 3, when entering a video upload page corresponding to the online access link, the terminal obtains a web worker file, asynchronously loads the web worker file to start the web worker thread, obtains a file configured for loading a video transcoding tool when the web worker thread is started, and loads the video transcoding tool by using the file configured for loading the video transcoding tool. When the video transcoding tool is loaded, the video information of the video is obtained through the web worker thread while invoking a video upload SDK to upload the video. When it is determined, according to the video information, that the video format of the video does not satisfy the video caching condition, the video is transcoded through the loaded video transcoding tool to obtain the transcoded video, and the transcoded video is locally cached to the local database. When it is determined, according to the video information, that the video format of the video satisfies the video caching condition, the video is directly locally cached to the local database.

In this embodiment, the web worker thread is started, and the video transcoding tool can be loaded by using the web worker thread, so that when it is determined, according to the video information, that the video format of the video does not satisfy the video caching condition, and the video is transcoded through the video transcoding tool to obtain the transcoded video. Video transcoding is handed over to an independent thread for processing, so that a main thread of a client on the terminal configured to implement video frame extraction only needs to focus on processing service logic, and does not need to spend too much time in processing a large amount of complex calculation, thereby shortening blocking time and improving running efficiency.

In an embodiment, the uploading a video through the online access link, and locally caching the video to a local database includes:

uploading the video through the online access link, generating a local video identifier of the video, and triggering a video query request carrying the local video identifier to a local database; and when a cached video corresponding to the local video identifier does not exist in the local database, caching the video to the local database.

Specifically, when uploading the video through the online access link, the terminal may obtain a source file of the video, so as to generate the local video identifier of the video based on the source file of the video, and trigger the video query request carrying the local video identifier to the local database to detect whether a cached video corresponding to the local video identifier exists in the local database. When the cached video corresponding to the local video identifier does not exist in the local database, the video is not locally cached to the local database, and the terminal caches the video to the local database. When the cached video corresponding to the local video identifier exists in the local database, the video is locally cached in the local database, and does not need to be repeatedly cached.

In a specific application, when the web worker thread is started, the local video identifier of the video may be generated based on the source file of the video through the web worker thread, and the video query request carrying the local video identifier is triggered to the local database. These tasks are handed over to an independent thread for processing, so that a main thread of a client on the terminal configured to implement video frame extraction only needs to focus on processing service logic, and does not need to spend too much time in processing a large amount of complex calculation, thereby shortening blocking time and improving running efficiency.

In this embodiment, whether the video corresponding to the local video identifier is cached in the local database can be detected, and the video is cached to the local database only when the cached video corresponding to the local video identifier does not exist in the local database, so that repeated operations can be avoided, and processing efficiency can be improved.

In some embodiments, the video frame extraction method further includes:

the extracted video frame and the playback time of target video frame are associated and locally cached to the local database; and in response to a video frame re-extraction request of the video, a video frame re-extraction time of the video is obtained, and a video frame query request carrying the video frame re-extraction time is triggered to the local database; and when a cached video frame matching the video frame re-extraction time exists in the local database, the cached video frame returned by the local database in response to the video frame query request is obtained.

The video frame re-extraction request refers to an event of re-extracting the video frame when an extracted video frame is extracted. The video frame re-extraction time refers to a playback time of a re-extracted video frame in the video.

Specifically, after extracting the extracted video frame, the terminal associates and locally caches the extracted video frame and the playback time of target video frame to the local database, and monitors the video frame re-extraction request for the video. When the video frame re-extraction request for the video is monitored, the terminal obtains the video frame re-extraction time in response to a video frame re-extraction request, triggers the video frame query request carrying the video frame re-extraction time to the local database to query whether cached video frame matching the video frame re-extraction time is cached in the local database, and obtains the cached video frame returned by the local database in response to the video frame query request when the cached video frame matching the video frame re-extraction time exists in the local database.

In a specific application, when the cached video frame matching the video frame re-extraction time does not exist in the local database, the terminal triggers a re-access request instructing to access the local access link and carrying the video frame re-extraction time, forwards the re-access request to the local database in response to identifying the local cache identifier from the local access link that the re-access request instructs to access, obtains the locally cached video returned by the local database in response to the re-access request, and extracts the video frame matching the video frame re-extraction time from the locally cached video.

In this embodiment, when the extracted video frame and the playback time of target video frame are associated and locally cached to the local database, in response to a video frame re-extraction request, the video frame re-extraction time of the video is obtained, the video frame query request carrying the video frame re-extraction time is triggered to the local database, and whether cached video frame matching the video frame re-extraction time is cached in the local database can be queried, so that the cached video frame returned by the local database in response to the video frame query request is directly obtained when the cached video frame matching the video frame re-extraction time exists in the local database, thereby avoiding repeated video frame extraction operations, and improving processing efficiency.

In some embodiments, the video frame extraction method further includes:

the extracted video frame is used as a video cover of the video in response to a video cover setting operation for the extracted video frame; and the video is published to a video platform based on a content delivery network (CDN) link of the video in response to a publishing operation for the video, where the CDN link is generated by a video platform server that caches the video.

Specifically, after extracting the video frame, if a video uploader intends to use the extracted video frame as the video cover of the video, the video cover setting operation for the extracted video frame is triggered, and the terminal uses the extracted video frame as the video cover of the video in response to the video cover setting operation for the extracted video frame. When the video cover is set, the video uploader may publish the video by triggering a publishing operation for the video. In response to the publishing operation for the video, the terminal publishs the video to the video platform based on the CDN link of the video. The CDN link is generated by the video platform server that caches the video.

In a specific application, when the video is uploaded through the online access link, the video is uploaded to the video platform server. After receiving the video, the video platform server performs uniform operations such as transcoding and compression on the video while reserving the source file of the video, and then provides external access in a form of a CDN link. Therefore, the video uploader may upload videos with different encodings and different formats, but finally, videos with a fixed encoding and a fixed format can be accessed through the CDN link. For example, the video with the fixed encoding and the fixed format may be specifically a video with an encoding format of H.264 and a video format of MP4.

In this embodiment, the extracted video frame is used as the video cover of the video in response to the video cover setting operation for the extracted video frame, so that the video cover can be set. The video is published to the video platform based on the CDN link of the video in response to a publishing operation for the video, so that the video can be published In some embodiments, the video frame extraction method further includes:

in response to a video cover modification event for the video, a cover video frame time of the video is obtained, and an obtaining request instructing to access the CDN link of the video and carrying the cover video frame time is triggered to the video platform server;

a background cached video returned by the video platform server in response to the obtaining request is obtained, and a modified cover frame is extracted from the background cached video, where the modified cover frame matches the cover video frame time; and the modified cover frame is updated to the video cover of the video.

The video cover modification event refers to an event that modifies the video cover of the video when the video is published. When the video is published, the video uploader may modify the video cover of the video by triggering the video cover modification event for the video. The cover video frame time refers to a playback time of the modified cover frame in the video.

Specifically, when the video is published, if the video uploader intends to modify the video cover of the video, the video cover modification event for the video may be triggered. In response to the video cover modification event for the video, the terminal obtains the cover video frame time of the video, and triggers the obtaining request instructing to access the CDN link of the video and carrying the cover video frame time to the video platform server. After receiving the obtaining request, the video platform server feeds back the background cached video in response to the obtaining request. The terminal obtains the background cached video returned by the video platform server in response to the obtaining request, extracts the modified cover frame from the background cached video, and updates the modified cover frame to the video cover of the video, where the modified cover frame matches the cover video frame time.

In a specific application, because the background cached video is remotely accessed through the CDN link, when the background cached video is relatively large, a local video frame extraction experience may be relatively laggy. Therefore, the terminal starts the web worker thread to perform video frame extraction on the background cached video. Before the extraction succeeds, the terminal first uses a default placeholder map, to avoid page rendering lag caused because a main thread of a client on the terminal configured to implement video frame extraction is occupied by video frame extraction logic. The default placeholder map may be configured according to an actual application scenario.

In this embodiment, in response to the video cover modification event for the video, the modified cover frame can be extracted by using the CDN link and the cover video frame time, and the modified video cover is updated to the video cover of the video, so that the video cover can be modified.

In an embodiment, the video frame extraction method in the present disclosure is described by using an example in which a video cover applied to a video is set. When applied to the video cover setting of the video, the video frame extraction method in the present disclosure is mainly divided into two scenarios: a newly adding scenario and a modifying scenario. The newly adding scenario refers to setting a video cover when the video cover of the video is not set. The modifying scenario refers to modifying a video cover when the video cover of the video is set. In the newly adding scenario, when video frame extraction is performed, the video configured for video frame extraction is a locally cached video obtained from a local database through a local access link. In the modifying scenario, when video frame extraction is performed, the video configured for video frame extraction is a background cached video obtained from a video platform server through a CDN link. The video frame extraction in the newly adding scenario and the modifying scenario are respectively described below.

Figure 4:
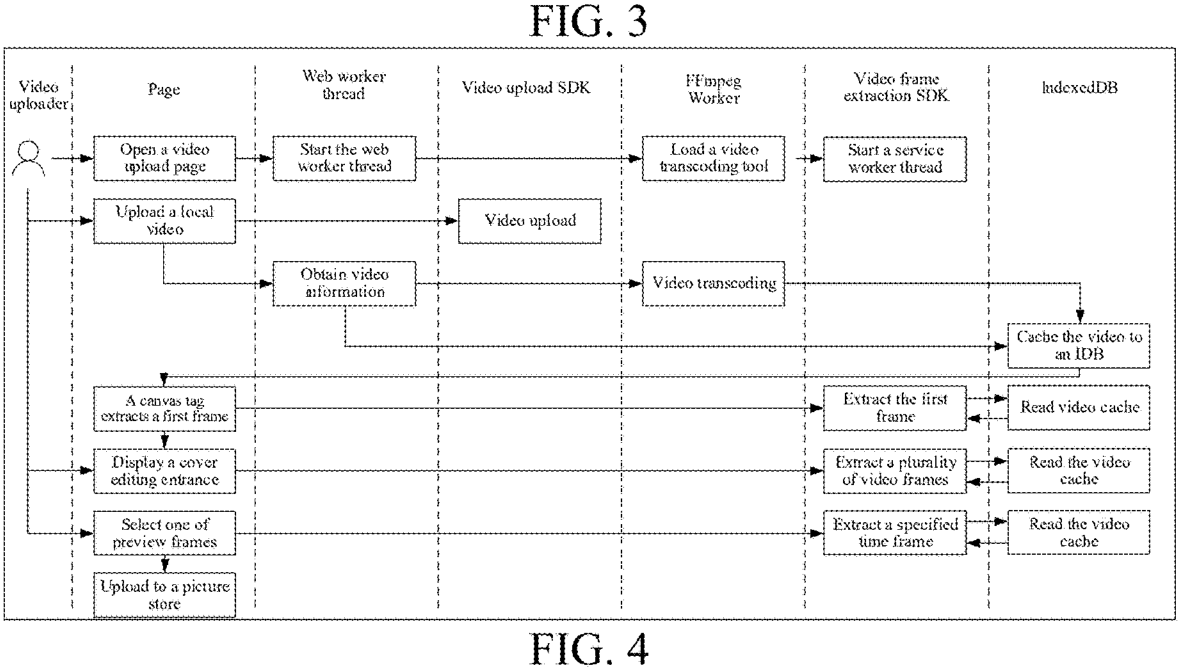
FIG. 4 is a schematic flowchart of setting a video cover in a newly adding scenario according to an embodiment.

In an embodiment, as shown in FIG. 4, in the newly adding scenario, if a video uploader intends to upload a video, a video upload page corresponding to an online access link is opened in a client (which may be specifically a browser) of a terminal. When entering the video upload page, the client first asynchronously loads a web worker file to start a web worker thread, and then the web worker thread loads a video transcoding tool (which may be specifically a fast forward mpeg (FFmpeg) worker as shown in FIG. 4) providing a video transcoding capability. The video transcoding tool can convert all video formats into standard H.264 encoded MP4-format files. When the video uploader uploads the video on the video upload page, the client obtains video information of the video through the web worker thread, including an encoding format, an encapsulation format, and the like, and determines, according to the video information, whether the video needs to be transcoded. When it is determined, according to the video information, that the video format of the video does not satisfy a video caching condition, the video is transcoded through a video transcoding tool to obtain a transcoded video, and the transcoded video is cached in a local database (lndexedDB in FIG. 4). If the video does not need to be transcoded, the foregoing operations are omitted.

In an embodiment, when uploading the video through the online access link, the client generates a local video identifier of the video, triggers a video query request carrying the local video identifier to the local database, and caches the video to the local database only when a cached video corresponding to the local video identifier does not exist in the local database.

In an embodiment, as shown in FIG. 4, in addition to loading the video transcoding tool, the client may further load a service worker file to start a service worker thread. After caching the video to the local database, the client generates a local access link of the video through the service worker thread according to the online access link. The local access link includes a local cache identifier and a local video identifier pointing to the video cached in the local database. The local access link may be returned through a video tag. In a specific application, as shown in FIG. 4, the client further includes a video frame extraction SDK. The service worker file may be loaded to the video frame extraction SDK to start the service worker thread, and a video frame extraction request for the video may be responded to in the video frame extraction SDK.

In an embodiment, when the local access link is returned through the video tag, the client monitors a video frame extraction request for the video. When the video frame extraction request for the video is monitored, the client obtains a playback time of target video frame of the video in response to the video frame extraction request for the video, and triggers an access request. The access request instructs to access the local access link and carries the playback time of target video frame. The service worker thread intercepts and identifies the access request, and forwards the access request to the local database in response to a local cache identifier in the local access link that the access request instructs to access, obtains a locally cached video returned by the local database in response to the access request, and extracts a video frame matching the playback time of target video frame from the locally cached video.

In a specific application, when the local access link is returned through the video tag, the client monitors a loadeddata event and a seeked event. As shown in FIG. 4, when the loadeddata event occurs, the video has been loaded by a memory, and an event of extracting a first video frame by using a canvas tag is automatically triggered. The canvas tag may obtain a playback time of target video frame corresponding to the first frame by reading the video tag, and trigger an access request instructing to access the local access link and carrying the playback time of target video frame corresponding to the first frame. The service worker thread intercepts and identifies the access request, forwards the access request to the local database in response to identifying a local cache identifier from the local access link that the access request instructs to access, obtains a locally cached video (that is, read video cache in FIG. 4) returned by the local database in response to the access request, extracts the first video frame from the locally cached video, and returns the first video frame to the video upload page of the client.

In a specific application, as shown in FIG. 4, a cover editing entrance is displayed on the video upload page while returning the first video frame to the video upload page of the client to prompt a video uploader to select a video cover. In response to a triggering operation for the cover editing entrance, the client triggers a preview triggering event for the video, and extracts a plurality of video frames to generate a plurality of fixed preview images corresponding to the plurality of video frames as preview frames of the video for the video uploader to select. When the video uploader selects one of the preview frames and monitors the seeked event, the video frame extraction request for the video is triggered, and a specified time frame in a newly adding scenario matching the playback time of target video frame corresponding to the selected preview frame is extracted by using the canvas tag. The canvas tag may obtain the playback time of target video frame corresponding to a targeted preview frame by reading the video tag, and trigger the access request instructing to access the local access link and carrying the playback time of target video frame corresponding to the targeted preview frame. The service worker thread intercepts and identifies the access request, forwards the access request to the local database in response to identifying the local cache identifier from the local access link that the access request instructs to access, obtains the locally cached video returned by the local database in response to the access request, and extracts the specified time frame in the newly adding scenario from the locally cached video. After extracting the specified time frame of the newly adding scenario, the terminal uploads the specified time frame of the newly adding scenario to a picture store for storage.

In a specific application, if the video uploader selects the specified time frame as the video cover of the video, a video cover setting operation for the specified time frame is triggered, and the client uses the specified time frame as the video cover of the video in response to the video cover setting operation for a specified video frame. After the video cover is set, the video uploader may trigger a publishing operation for the video, and the client publishes the video to a video platform based on the CDN link of the video in response to the publishing operation for the video.

In an embodiment, in a modifying scenario, if the video uploader intends to modify a cover of a published video, a video cover modification event for the video may be triggered on an editing content page displayed on the client. In response to the video cover modification event for the video, the client obtains a cover video frame time of the video, triggers an obtaining request instructing to access a CDN link of the video and carrying the cover video frame time to a video platform server, obtains a background cached video returned by the video platform server in response to the obtaining request, and extracts a modified cover frame from the background cached video, where the modified cover frame matches the cover video frame time, and updates the modified cover frame to the video cover of the video.

Figure 5:
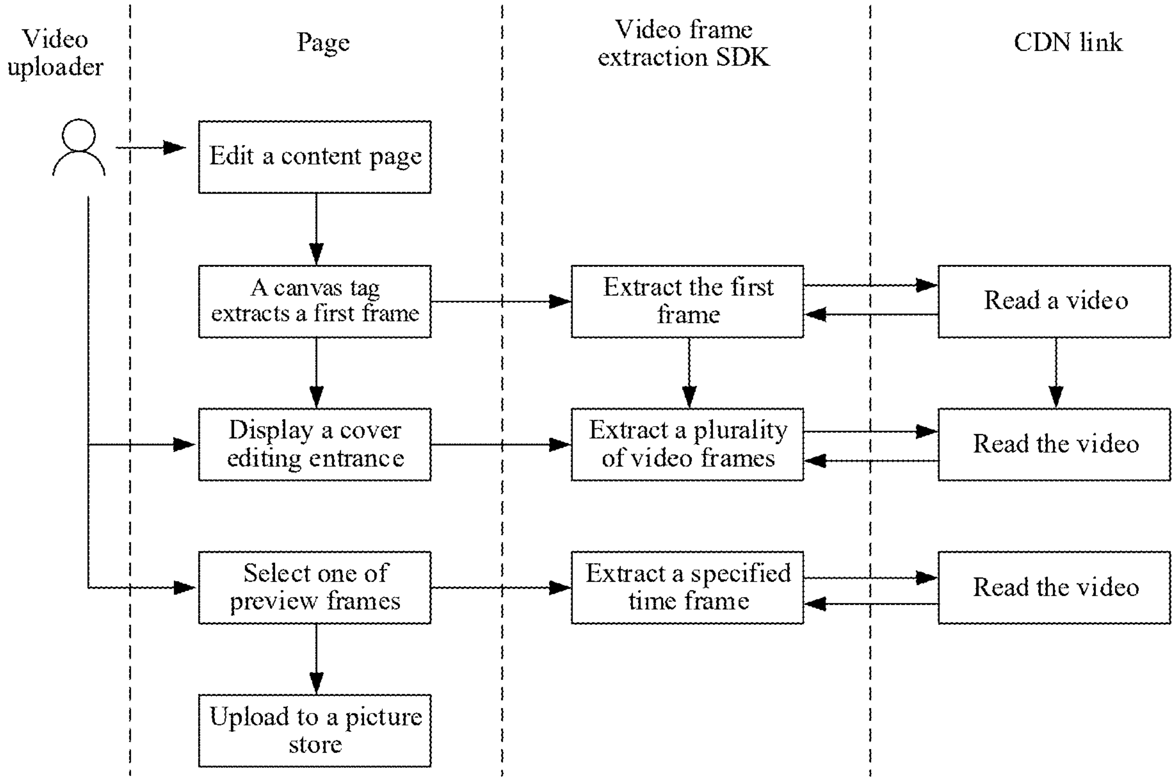
FIG. 5 is a schematic flowchart of setting a video cover in a modifying scenario according to an embodiment of the present disclosure.

In an embodiment, as shown in FIG. 5, in response to a video cover modification event for a video, a client first invokes a video frame extraction SDK to access a CDN link to read a background cached video, extracts a first video frame from the background cached video, returns the first video frame to an editing content page of the client, and displays a cover editing entrance on the editing content page to prompt a video uploader to edit the video cover. In response to a triggering operation for the cover editing entrance, the client triggers a preview triggering event for the video, and invokes the video frame extraction SDK to access the CDN link to read the background cached video, extracts a plurality of video frames from the background cached video to generate a plurality of fixed preview images corresponding to the plurality of video frames as preview frames of the video for the video uploader to select. When the video uploader selects one of the preview frames and monitors the seeked event, the video frame extraction SDK is invoked to extract a specified time frame of a modifying scenario matching a playback time of target video frame corresponding to the selected preview frame, that is, the modified cover frame. The modified cover frame is updated to the video cover of the video, and is uploaded to a picture store for storage.

In an embodiment, the video frame is mainly extracted by using a canvas tag when the video frame extraction SDK is invoked to extract the video frame from the background cached video. Using extracting the modified cover frame as an example, the canvas tag reads a video tag, obtains a cover video frame time of the video, triggers an obtaining request instructing to access the CDN link of the video and carrying the cover video frame time to the video platform server, obtains the background cached video returned by the video platform server in response to the obtaining request, and extracts the modified cover frame from the background cached video, where the modified cover frame matches the cover video frame time.

Figure 6:
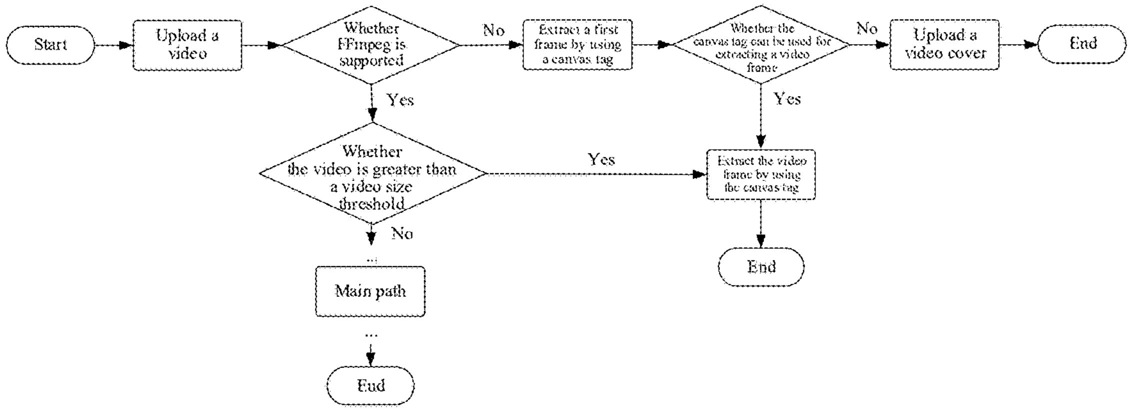
FIG. 6 is a schematic diagram of video frame extraction logic of a downgrading solution for setting a video cover according to an embodiment of the present disclosure.

In an embodiment, when applied to video cover setting of a video, the terminal needs to detect support degree of the client for FFmpeg and Canvas (a Canvas tag), and uses a downgrading solution when the terminal does not support the FFmpeg and the Canvas (Canvas tag). Video frame extraction logic of the downgrading solution is shown in FIG. 6.

If the client supports the FFmpeg and the uploaded video is not greater than a video size threshold, a main path, that is, the foregoing video frame extraction method, is used. If the client supports the FFmpeg but the uploaded video is greater than the video size threshold, the video frame extracted is performed by using the canvas tag. If the client does not support the FFmpeg and can use the canvas tag to perform the video frame extraction, the video frame extraction is performed by using the canvas tag. If the client does not support the FFmpeg and cannot use the canvas tag to perform video frame extraction, the video cover of the video is directly uploaded. The video size threshold may be configured according to an actual application scenario. The video cover that is directly uploaded may be configured according to an actual application scenario. For example, the first video frame may be directly uploaded as the video cover.

Figure 7:
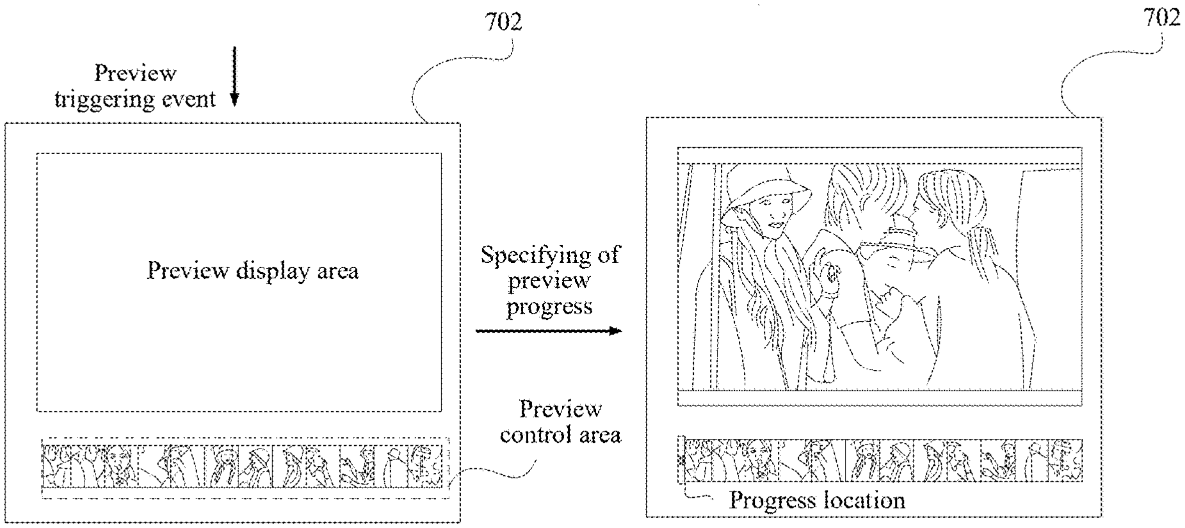
FIG. 7 is a diagram of an application environment of a video preview interaction method according to an embodiment of the present disclosure.

A video preview interaction method according to an embodiment of the present disclosure may be applied to an application environment shown in FIG. 7. A client configured to implement video preview interaction is installed on a terminal 702. The client may be an application, may be a web client, or may be a child application that runs in a running environment of a parent application. The terminal 702 displays a preview control area and a preview display area of a video in response to a preview triggering event for the video, arranges and displays a plurality of fixed preview images that are from the video and are spaced away from each other according to timing in a corresponding progress time range in the video in the preview control area, marks, in response to specifying of preview progress of the preview control area in a fixed preview image specified by the preview progress in the preview control area, a progress location specified by the preview progress within a corresponding progress time interval of the specified fixed preview image in the video, and displays, in the preview display area, a video frame preview image of a video frame corresponding to the progress time indicated by the progress location in the video. The terminal 702 may be, but is not limited to, various desktop computers, notebook computers, smartphones, tablet computers, Internet of Things devices, and portable wearable devices. The Internet of Things devices may be smart speakers, smart televisions, smart air conditioners, smart in-vehicle devices, and the like. The portable wearable devices may be smart watches, smart bracelets, head-mounted devices, and the like.

Figure 8:
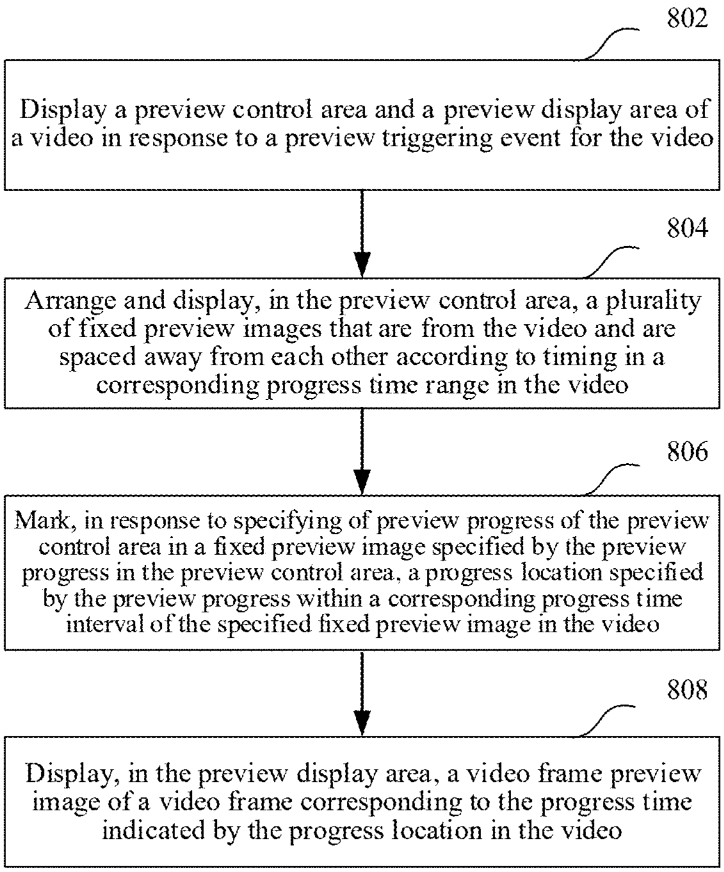
FIG. 8 is a schematic flowchart of a video preview interaction method according to an embodiment of the present disclosure.

In an embodiment, as shown in FIG. 8, a video preview interaction method is provided. The method may be performed by a terminal or a server independently, or may be jointly performed by a terminal and a server. In this embodiment of the present disclosure, an example in which the method is applied to a terminal is used for description. The method includes the following operations:

Operation 802: Display a preview control area and a preview display area of a video in response to a preview triggering event for the video.

The preview triggering event refers to an event of previewing a video frame in the video. The preview control area refers to an area for controlling video frame preview, and the preview display area refers to an area for displaying a video frame preview image.

Figure 9:
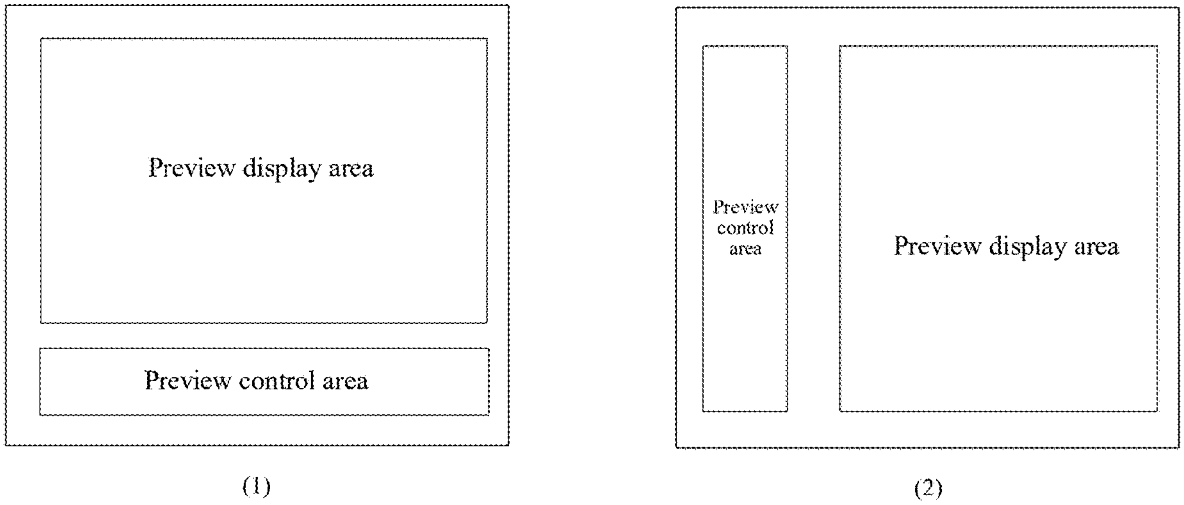
FIG. 9 is a schematic diagram of a layout mode of a preview control area and a preview display area according to an embodiment of the present disclosure.

Specifically, the terminal displays the preview control area and the preview display area of the video in response to the preview triggering event for the video. In a specific application, the preview triggering event for the video may be triggered by an interaction object when the interaction object needs to preview the video frame in the video. In a specific application, the interaction object may be a video uploader, and the video uploader may trigger the preview triggering event for the video when video frame extraction needs to be performed to preview the video frame in the video, so as to select the video frame that needs to be extracted. In a specific application, a layout mode of the preview control area and the preview display area that are displayed may be shown in (1) in FIG. 9. The preview display area is displayed above the preview control area, and a size of the preview display area is larger than that of the preview control area. A layout mode of the displayed preview control area and the preview display area may alternatively be shown in (2) in FIG. 9. The preview display area is displayed on a right side of the preview control area, and a size of the preview display area is larger than that of the preview control area.

Operation 804: Arrange and display, in the preview control area, a plurality of fixed preview images that are from the video and are spaced away from each other according to timing in a corresponding progress time range in the video.

The fixed preview image is an image obtained after processing the video frame extracted from the video for previewing, and corresponds to the video frame extracted from the video for previewing.

Specifically, the terminal arranges and displays, in the preview control area, the plurality of fixed preview images that are from the video and are spaced from each other according to the timing in the corresponding progress time range in the video. In a specific application, in response to a preview triggering event for the video, the terminal extracts a plurality of spaced video frames for previewing from the video, processes the plurality of video frames for previewing to obtain a fixed preview image corresponding to each video frame, and then arranges and displays the plurality of fixed preview images according to the timing in the corresponding progress time range in the video.

In a specific application, progress time ranges corresponding to the plurality of fixed preview images in the video may be determined according to video playback time of the plurality of video frames extracted from the video for previewing in the video. For each video frame in the plurality of video frames for previewing, a video playback time range between video playback time of a targeted video frame and video playback time of a previously extracted video frame is the progress time range that corresponds to the fixed preview image corresponding to the targeted video frame and that is in the video. In a specific application, for a video frame extracted for the first time in the plurality of video frames for previewing, the progress time range that corresponds to the fixed preview image corresponding to the video frame extracted for the first time and that is in the video is a video playback time range between video playback time of the video frame extracted for the first time and a 0th second.

In a specific application, assuming that video duration of a video is 60 seconds, a plurality of video frames for previewing are extracted at equal time intervals, and 12 video frames are extracted. A video frame is extracted every five seconds, a video playback time of a video frame extracted for a first time is 5 seconds, a video playback time of a video frame extracted for a second time is 10 seconds, and so on. A video playback time of a video frame extracted for a twelfth time is 60 seconds, a progress time range that corresponds to a fixed preview image corresponding to the video frame extracted for the first time and that is in the video is 0 to 5 seconds, a progress time range that corresponds to the fixed preview image corresponding to the video frame extracted for the second time and that is in the video is 5 to 10 seconds, and a progress time range that corresponds to the fixed preview image corresponding to the video frame extracted for the twelfth time and that is in the video is 55 seconds to 60 seconds.

Operation 806: Mark, in response to specifying of preview progress of the preview control area in a fixed preview image specified by the preview progress in the preview control area, a progress location specified by the preview progress within a corresponding progress time interval of the specified fixed preview image in the video.

The specifying of the preview progress is used to specify progress of video preview. For example, the specifying of the preview progress may be a selection operation of any location in any fixed preview image of the plurality of fixed preview images.

Specifically, the plurality of fixed preview images displayed in the preview control area are equivalent to a preview image progress bar. If the interaction object intends to specify the video preview progress, specifying the preview progress may be triggered for the preview control area. In response to specifying of the preview progress of the preview control area, the terminal marks, in the fixed preview images specified by the preview progress in the preview control area, a progress location specified by the preview progress within a corresponding progress time interval of the specified fixed preview image in the video.

Figure 10:
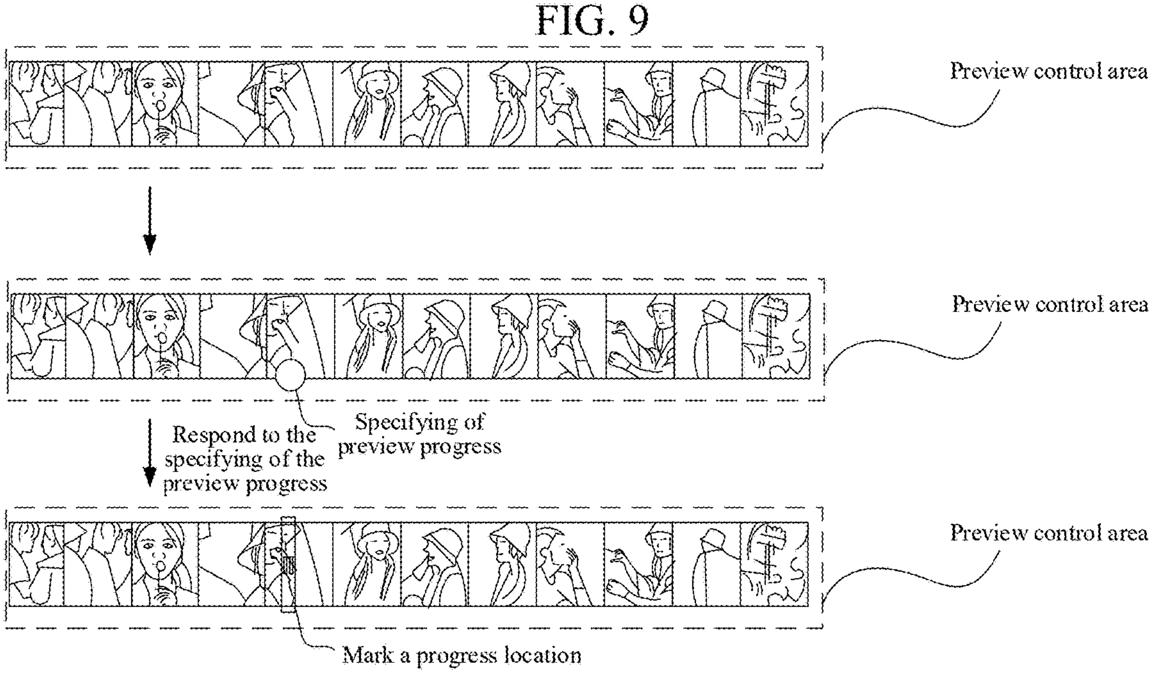
FIG. 10 is a schematic diagram of specifying response preview progress according to an embodiment of the present disclosure.
Figure 12:
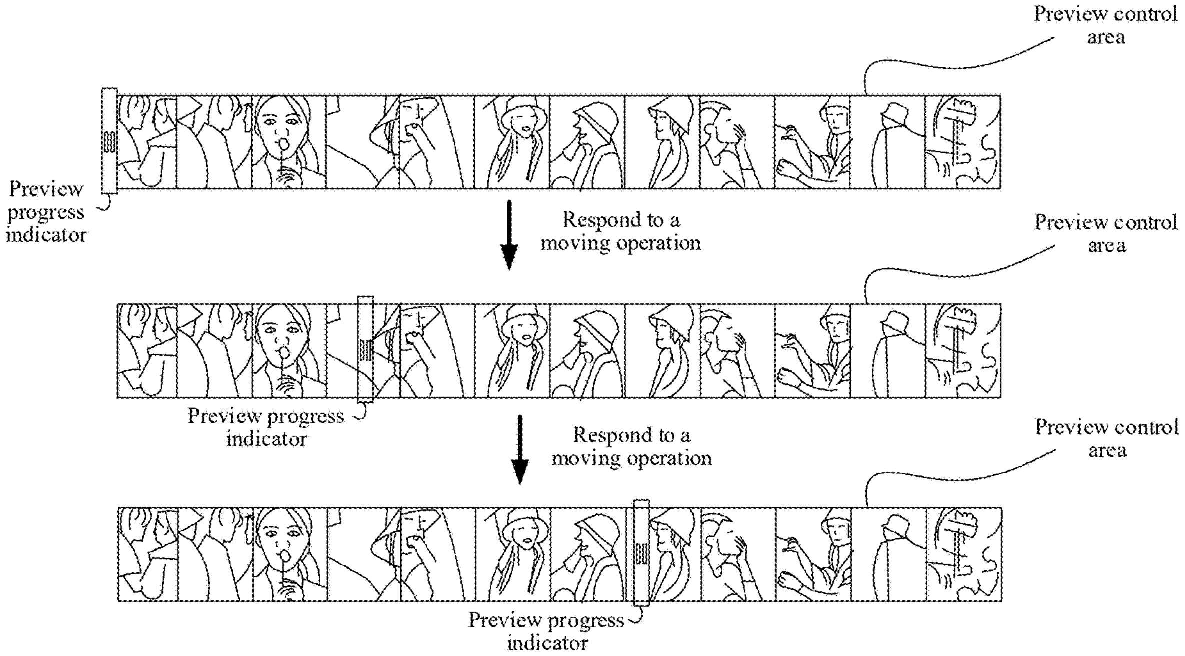
FIG. 12 is a schematic diagram in response to a moving operation for a preview progress indicator.

In a specific application, as shown in FIGS. 10, 12 fixed preview images are displayed in the preview control area. If the interaction object intends to specify the video preview progress, specifying of the preview progress may be triggered for the preview control area (that is, a selection operation for any location in any fixed preview image of the plurality of fixed preview images, herein assuming that the specifying of the preview progress is a selection operation for any location in a fifth fixed preview image). In response to the specifying of the preview progress of the preview control area, the terminal marks, in the fifth fixed preview image specified by the preview progress in the preview control area, a progress location specified by the preview progress within a corresponding progress time interval of the specified fixed preview image in the video, that is, a selected location in the fifth fixed preview image.

Operation 808: Display, in the preview display area, a video frame preview image of a video frame corresponding to the progress time indicated by the progress location in the video.

Specifically, after marking the progress location, the terminal performs video frame extraction by using the progress time indicated by the progress location as a playback time of target video frame of the video, to obtain the video frame corresponding to the progress time indicated by the progress location in the video, and displays, in the preview display area, the video frame preview image of the video frame corresponding to the progress time indicated by the progress location in the video. The video frame corresponding to the progress time indicated by the progress location in the video may be understood as a video frame matching the playback time of target video frame.

Figure 11:
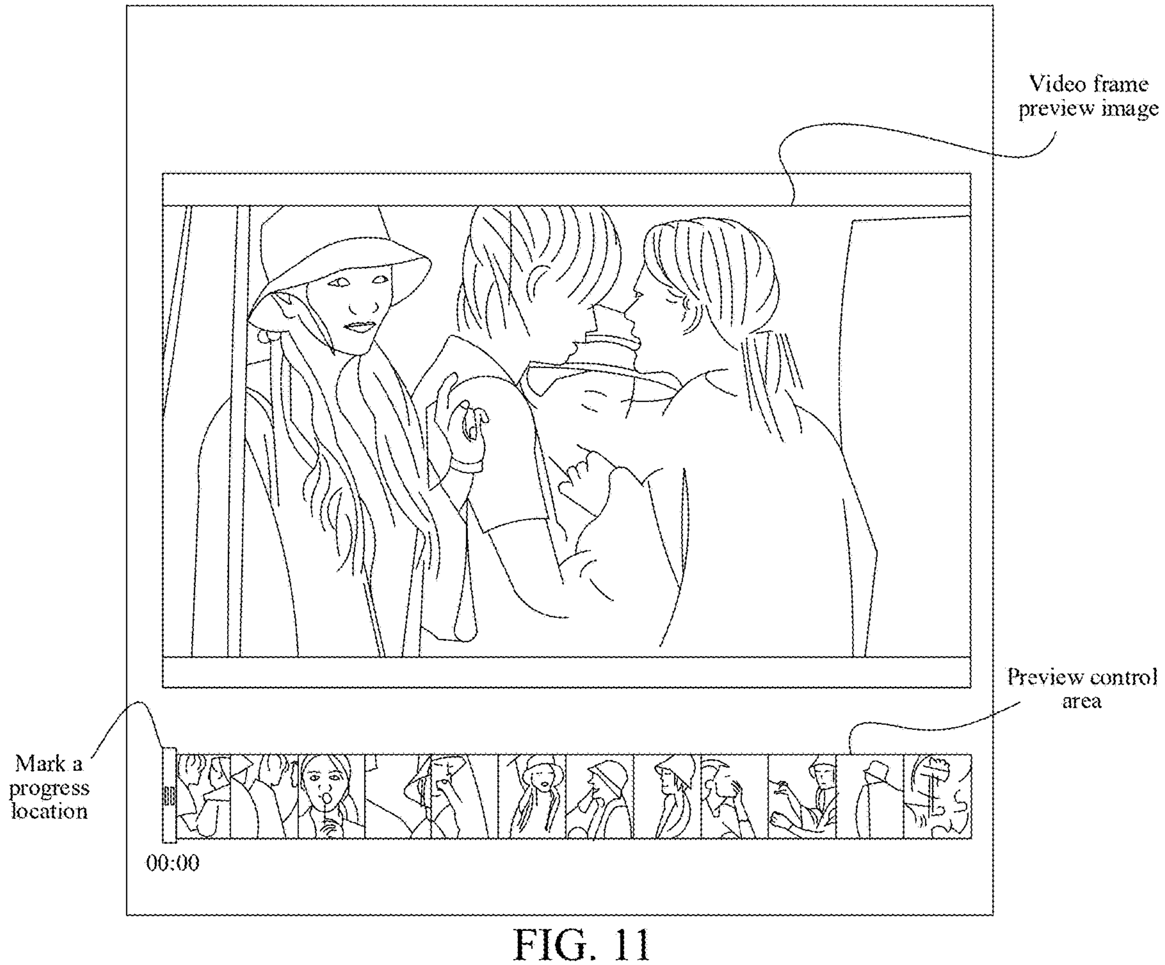
FIG. 11 is a schematic diagram of displaying a video frame preview image according to an embodiment of the present disclosure.

In a specific application, as shown in FIGS. 11, 12 fixed preview images are displayed in the preview control area. If the specifying of the preview progress triggered for the preview control area is a selection operation on an illustrated location in a first fixed preview image, the terminal marks, in a first fixed preview image specified by the preview progress in the preview control area, a progress location specified by the preview progress within a corresponding progress time interval of the specified fixed preview image in the video, that is, a selected location in the first fixed preview image, displays a progress time (00:00 in FIG. 11) indicated by the progress location, and displays, in the preview display area, the video frame preview image of the video frame corresponding to the progress time indicated by the progress location in the video.

According to the foregoing video preview interaction method, in response to a preview triggering event for a video, a preview control area and a preview display area of the video are displayed. In the preview control area, a plurality of spaced fixed preview images from the video are arranged and displayed according to timing in a corresponding progress time range in the video, so that video frame extraction can be guided by using the plurality of fixed preview images, to quickly and accurately locate a video frame that needs to be extracted. In response to specifying of preview progress of the preview control area, in the fixed preview images specified by the preview progress in the preview control area, a progress location specified by the preview progress within a corresponding progress time interval of the specified fixed preview image in the video is marked, so that the video frame extraction can be quickly located and indicated. Further, a video frame preview image of the video frame corresponding to the progress time indicated by the progress location in the video may be displayed in the preview display area, to implement quick and smooth video frame extraction.

In an embodiment, the video preview interaction method further includes:

- a preview progress indicator is displayed in the preview control area, where the preview progress indicator is configured to specify the preview progress in the preview control area; and
- in response to a moving operation for the preview progress indicator, the preview progress indicator moving along an arrangement track of the plurality of fixed preview images is displayed, where a location of the preview progress indicator in the preview control area is configured for marking a progress location specified by the preview progress.

Specifically, in the preview control area, the terminal displays the preview progress indicator. The preview progress indicator is configured to specify preview progress in the preview progress area. In response to the moving operation for the preview progress indicator, the terminal displays the preview progress indicator moving along an arrangement track of the plurality of fixed preview images. The location of the preview progress indicator in the preview control area is configured for marking the progress location specified by the preview progress.

In a specific application, as shown in FIG. 12, a plurality of fixed preview images may be arranged horizontally. In the preview control area, a preview progress indicator is displayed. The preview progress indicator is located at a leftmost side of the plurality of fixed preview images at first. In response to a moving operation for the preview progress indicator, the terminal displays the preview progress indicator moving along an arrangement track of the plurality of fixed preview images.

In this embodiment, the preview progress indicator is displayed, so that the preview progress can be specified in the preview control area by using the preview progress indicator. In response to the moving operation for the preview progress indicator, the preview progress indicator moving along the arrangement track of the plurality fixed preview images is displayed, so that the specifying of the preview progress can be displayed, further, the progress location specified by the preview progress can be marked by using the location of the preview progress indicator in the preview control area.

In an embodiment, the video preview interaction method further includes:

- in response to a cover capture operation for the video frame preview image, at least part of the video frame preview image indicated by the cover capture operation is highlighted in the preview display area; and
- in response to a cover setting operation for the video, the at least part of the highlighted video frame preview image indicated by the cover capture operation is displayed as the video cover of the video.

The cover capture operation refers to an operation of capturing a part from the video frame preview image as the video cover.

Specifically, when an interaction object has a requirement of capturing a part of the video frame preview image as a video cover, a cover capture operation for the video frame preview image is triggered. In response to the cover capture operation for the video frame preview image, the terminal highlights at least part of the video frame preview image indicated by the cover capture operation in the preview display area. If the interaction object determines that the at least part of the highlighted video frame preview image indicated by the cover capture operation is used as the video cover, a cover setting operation for the video may be triggered. In response to the cover setting operation for the video, the terminal displays the at least part of the highlighted video frame preview image indicated by the cover capture operation as the video cover of the video.

In this embodiment, the at least part of the video frame preview image indicated by the cover capture operation is highlighted in the preview display area in response to the cover capture operation for the video frame preview image, so that the at least part indicated by the cover capture operation that is concerned about can be more quickly and directly concerned about. The at least part of the highlighted video frame preview image indicated by the cover capture operation is displayed as the video cover of the video in response to the cover setting operation for the video, thereby implementing setting of the video cover.

In an embodiment, the video preview interaction method further includes:

a cover capture area is displayed in a preview display area, where the cover capture area displays at least part of a video frame preview image; and that the in response to a cover capture operation for the video frame preview image, at least part of the video frame preview image indicated by the cover capture operation is highlighted in the preview display area includes:

in response to the cover capture operation for the video frame preview image, a cover capture area that changes according to an area adjustment mode indicated by the cover capture operation is displayed, and the at least part of the cover capture area captured from the video frame preview image is displayed in the cover capture area.

Specifically, the terminal displays the cover capture area in the preview display area, where the cover capture area displays the at least part of the video frame preview image. If the interaction object intends to capture the video frame preview image, a cover capture operation for the video frame preview image may be triggered. In response to the cover capture operation for the video frame preview image, the terminal displays the cover capture area that changes according to the area adjustment mode indicated by the cover capture operation, and displays, in the cover capture area, the at least the part of the cover capture area captured from the video frame preview image. In a specific application, the cover capture operation may be specifically an area adjusting operation for the cover capture area. The area adjustment operation may be specifically a moving operation on the cover capture area, or may be a zooming operation on the cover capture area.

Figure 13:
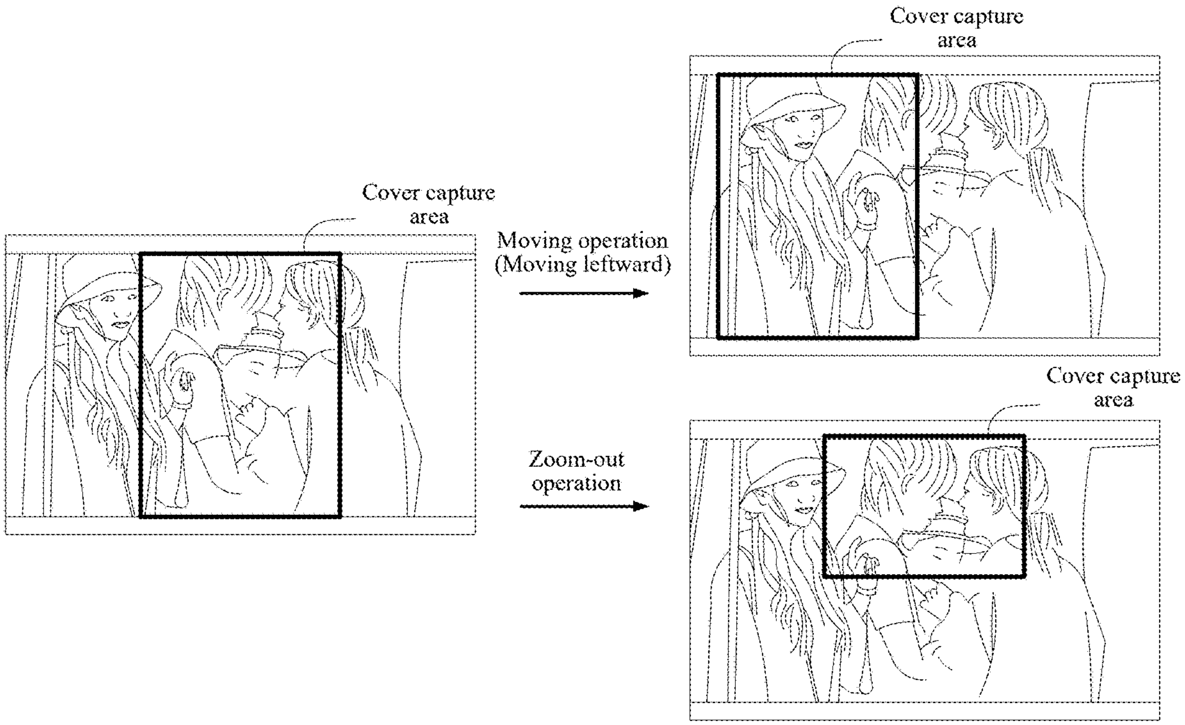
FIG. 13 is a schematic diagram in response to a cover capture operation according to an embodiment of the present disclosure.

In a specific application, as shown in FIG. 13, the terminal displays a cover capture area (indicated by a bold black box in FIG. 13) in a preview display area. The cover capture area displays at least part of the video frame preview image. If the cover capture operation for the video frame preview image is a moving operation for the cover capture area, in response to the cover capture operation for the video frame preview image, the terminal displays the cover capture area that changes according to a moving direction (assuming to move to the left in FIG. 13) indicated by the moving operation on the cover capture area. If the cover capture operation for the video frame preview image is a zoom-out operation on the cover capture area, in response to the cover capture operation for the video frame preview image, the terminal displays the cover capture area that changes according to a zoom-out direction indicated by the zoom-out operation on the cover capture area.

In this embodiment, the cover capture area is displayed in the preview display area, so that the video frame preview image can be captured by responding the cover capture operation for the video frame preview image by using the cover capture area.

In an embodiment, the video preview interaction method further includes:

an initial video cover and a cover editing entrance of the video are displayed in response to an uploading operation for a video when the video is locally cached to a local database; and a preview triggering event for the video is triggered in response to a triggering operation for the cover editing entrance.

Specifically, the terminal displays the initial video cover and the cover editing entrance of the video in response to the uploading operation for the video when the video is locally cached to the local database. If an interaction object (that is, a video uploader) intends to modify the initial video cover, the triggering operation for the cover editing entrance may be triggered. In response to the triggering operation for the cover editing entrance, the terminal triggers the preview triggering event for the video. In a specific application, the initial video cover may be configured according to an actual application scenario. For example, the initial video cover may be any video frame in the video. For example, the initial video cover may be a first video frame in the video.

In this embodiment, the initial video cover and the cover editing entrance of the video are displayed in response to the uploading operation for the video when the video is locally cached to the local database, so that the cover editing entrance can be provided to modify the initial video cover. Further, the preview triggering event for the video may be triggered in response to the triggering operation for the cover editing entrance, to edit the video cover through video preview interaction.

In an embodiment, in the plurality of video frames corresponding to the plurality of fixed preview images in the video, a time interval between every two neighboring video frames is equal; and every two neighboring fixed preview images of the plurality of rectangular fixed preview images arranged along a preset arrangement direction in the preview control area are connected through side lengths, and a direction of the side length is perpendicular to the preset arrangement direction.

Specifically, the terminal may obtain the plurality of video frames corresponding to the plurality of fixed preview images in the video in a mode of extracting video frames from the video at equal time intervals, and may further obtain the plurality of fixed preview images by processing the plurality of video frames. Every two neighboring fixed preview images of the plurality of rectangular fixed preview images arranged along a preset arrangement direction in the preview control area are connected through side lengths, and a direction of the side length is perpendicular to the preset arrangement direction. The preset arrangement direction may be configured according to an actual application scenario. For example, the preset arrangement direction may be a horizontal direction, or a vertical direction. The direction of the side length is perpendicular to the preset arrangement direction, that is, when the preset arrangement direction is the horizontal direction, the direction of the side length is the vertical direction; and when the preset arrangement direction is the vertical direction, the direction of the side length is the horizontal direction. Because the time interval between every two neighboring video frames is equal, sizes of rectangular shapes of the fixed preview images are the same. If the time interval between every two neighboring video frames is not equal, the sizes of the rectangular shapes of the fixed preview images are not exactly the same, and the length of the rectangular shape is positively correlated to the time interval. A longer time interval indicates a longer length of the rectangular shape.

Figure 14:
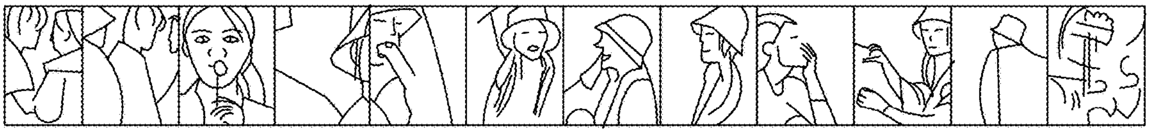
FIG. 14 is a schematic diagram of displaying a plurality of fixed preview images according to an embodiment of the present disclosure.

In a specific application, assuming that video duration of the video is 60 seconds, the plurality of video frames corresponding to the plurality of fixed preview images in the video are extracted at equal time intervals, and 12 video frames are extracted, a time interval between every two neighboring video frames is 5 seconds. Further, assuming that the preset arrangement direction is the horizontal direction, and the direction of the side length is the vertical direction, the plurality of fixed preview images displayed in the preview control area may be shown in FIG. 14, the number of the plurality of fixed preview images displayed in the preview control area is the same as that of the extracted video frames, and 12 rectangular fixed preview images are included. Each two neighboring fixed preview images are connected through the side lengths.

In this embodiment, in this mode, the plurality of fixed preview images can be displayed, and display forms of the plurality of fixed preview images are enriched.

In an embodiment, the video preview interaction method in the present disclosure is described by using an example of a client applied to a terminal and configured to upload a video. In the client configured to upload the video, a video uploader may upload the video through a video upload page provided by the client configured to upload the video. After the video is uploaded, the video uploader has a demand to select any frame in the video as a video cover.

The video uploader triggers an uploading operation for the video on the client in the terminal. The client in the terminal displays an initial video cover and a cover editing entrance of the video in response to the uploading operation for the video when the video is locally cached to a local database, triggers a preview triggering event for the video in response to a triggering operation for the cover editing entrance, and displays a preview control area and a preview display area of the video in response to the preview triggering event for the video.

In the preview control area, a plurality of fixed preview images that are from the video and are spaced from each other are arranged and displayed according to timing in a corresponding progress time range in the video, and a preview progress indicator is displayed. The preview progress indicator is configured to specify preview progress in the preview control area. A time interval between every two neighboring video frames of the plurality of fixed preview images in the plurality of video frames corresponding to the video is equal, every two neighboring fixed preview images of the plurality of rectangular fixed preview images arranged along a preset arrangement direction in the preview control area are connected through side lengths, and a direction of the side length is perpendicular to the preset arrangement direction.

The video uploader triggers a moving operation for the preview progress indicator. The client in the terminal displays, in response to a moving operation for the preview progress indicator, the preview progress indicator moving along an arrangement track of the plurality of fixed preview images, where a location of the preview progress indicator in the preview control area is configured for marking a progress location specified by the preview progress, and displays, in the preview display area, the video frame preview image of the video frame corresponding to the progress time indicated by the progress location in the video. In addition, a cover capture area is displayed in the preview display area, where the cover capture area displays at least part of the video frame preview image.

The video uploader may perform cover capture by triggering a cover capture operation for the video frame preview image. In response to the cover capture operation for the video frame preview image, the client in the terminal displays a cover capture area that changes according to an area adjustment mode indicated by the cover capture operation, and displays, in the cover capture area, at least part of the cover capture area captured from the video frame preview image. When the video cover is captured, the video uploader may set the video cover by triggering a cover setting operation for the video. In response to the cover setting operation for the video, the client in the terminal displays the at least one part of the cover capture area captured from the video frame preview image as the video cover of the video.

Although various operations in the flowcharts involved in various embodiments described above are sequentially displayed according to instructions of arrows, these operations are not necessarily sequentially performed according to the sequence instructed by the arrows. Unless otherwise explicitly specified in the present disclosure, execution of these operations is not strictly limited, and these operations may be performed in other sequences. Moreover, at least part of the operations in flowcharts involved in various embodiments described above may include a plurality of operations or a plurality of stages. These operations or stages are not necessarily performed at the same moment but may be performed at different moments. These operations or stages are not necessarily sequentially performed, but may be in turn or alternately performed with other operations or at least part of the operations or stages of other operations.

Based on the same inventive concept, the embodiments of the present disclosure further provide a video frame extraction apparatus configured to implement the video frame extraction method mentioned above and a video preview interaction apparatus configured to implement the video preview interaction method mentioned above. An implementation solution provided by the apparatus for resolving a problem is similar to the implementation solution recorded in the foregoing method. Therefore, for specific limitations on one or more video frame extraction apparatus and video preview interaction apparatus embodiments provided below, refer to the limitations on the foregoing video frame extraction method and video frame preview interaction method. Details are not described herein again.

Figure 15:
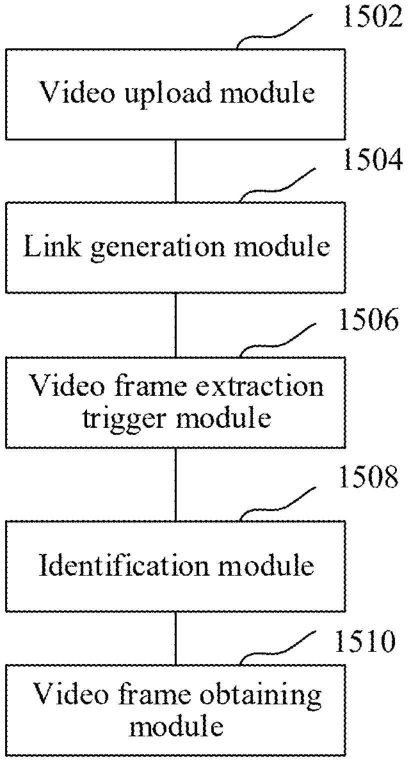
FIG. 15 is a structural block diagram of a video frame extraction apparatus according to an embodiment of the present disclosure.

In an embodiment, as shown in FIG. 15, a video frame extraction apparatus is provided, including: a video upload module 1502, a link generation module 1504, a video frame extraction trigger module 1506, an identification module 1508, and a video frame obtaining module 1510.

The video upload module 1502 is configured to upload a video through an online access link, and locally cache the video to a local database.

The link generation module 1504 is configured to generate a local access link of the video according to the online access link, where the local access link includes a local cache identifier and a local video identifier pointing to the video cached in the local database.

The video frame extraction trigger module 1506 is configured to obtain a playback time of target video frame of the video in response to a video frame extraction request for the video, and trigger an access request, where the access request instructs to access the local access link and carrying the playback time of target video frame.

The identification module 1508 is configured to forward the access request to the local database in response to identifying the local cache identifier from the local access link that the access request instructs to access, to enable the local database to return, in response to the access request, a locally cached video that is matched based on the local video identifier.

The video frame obtaining module 1510 is configured to obtain the locally cached video returned by the local database in response to the access request, and extract a video frame matching the playback time of target video frame from the locally cached video.

According to the foregoing video frame extraction apparatus, a video is uploaded through an online access link, the video is locally cached to a local database, and a local access link, including a local cache identifier and a local video identifier pointing to the video cached in the local database, of the video is generated according to the online access link, so that the local access link for the video can be constructed. Therefore, when a playback time of target video frame of the video is obtained in response to a video frame extraction request for the video, an access request instructing to access the local access link and carrying the video frame extraction request is triggered, and the local cache identifier in the local access link that the access request instructs to access is identified, the access request is forwarded to the local database to obtain the locally cached video returned by the local database in response to the access request, and a video frame matching the playback time of target video frame is extracted from the locally cached video, a closed loop in which the video is uploaded and is opened through the local access link for video frame extraction is implemented, a time from obtaining to extracting the video frame is shortened, and the video frame can be extracted smoothly.

In an embodiment, the link generation module is further configured to obtain a local cache identifier, a local video identifier of the video, and a link parameter of the online access link, and generate the local access link of the video according to the local cache identifier, the local video identifier, and the link parameter.

In an embodiment, the identification module is further configured to start a service worker thread. The service worker thread is configured for intercepting and identifying the access request. In response to identifying the local cache identifier from the local access link that the access request instructs to access, the service worker thread forwards the access request to the local database.

In an embodiment, the video upload module is further configured to upload the video through the online access link, obtain video information of the video, transcode the video to obtain a transcoded video when it is determined, according to the video information, that a video format of the video does not satisfy a video caching condition, where the video format of the transcoded video satisfies the video caching condition, and locally cache the transcoded video to the local database.

In an embodiment, the video upload module is further configured to start a web worker thread, load a video transcoding tool through the web worker thread, and transcode the video through the video transcoding tool to obtain a transcoded video when it is determined, according to the video information, that the video format of the video does not satisfy the video caching condition.

In an embodiment, the video upload module is further configured to upload the video through the online access link, generate a local video identifier of the video, trigger a video query request carrying the local video identifier to the local database, and cache the video to the local database only when a cached video corresponding to the local video identifier does not exist in the local database.

In an embodiment, the video frame obtaining module is further configured to associate and locally cache the extracted video frame and the playback time of target video frame to the local database, in response to a video frame re-extraction request, obtain a video frame re-extraction time of the video, trigger a video frame query request carrying the video frame re-extraction time to the local database, and obtain a cached video frame returned by the local database in response to the video frame query request when the cached video frame matching the video frame re-extraction time exists in the local database.

In an embodiment, the video frame extraction apparatus further includes a video publishing module. The video publishing module is configured to use the extracted video frame as a video cover of the video in response to a video cover setting operation for the extracted video frame, and publish the video to a video platform based on a CDN link of the video in response to a publishing operation for the video. The CDN link is generated by a video platform server that caches the video.

In an embodiment, the video frame extraction apparatus further includes a cover updating module. The cover updating module is configured to obtain a cover video frame time of the video in response to a video cover modification event for the video, trigger an obtaining request instructing to access a CDN link of the video and carrying the cover video frame time to the video platform server, obtain a background cached video returned by the video platform server in response to the obtaining request, and extract a modified cover frame from the background cached video, where the modified cover frame matches the cover video frame time, and update the modified cover frame to the video cover of the video.

Figure 16:
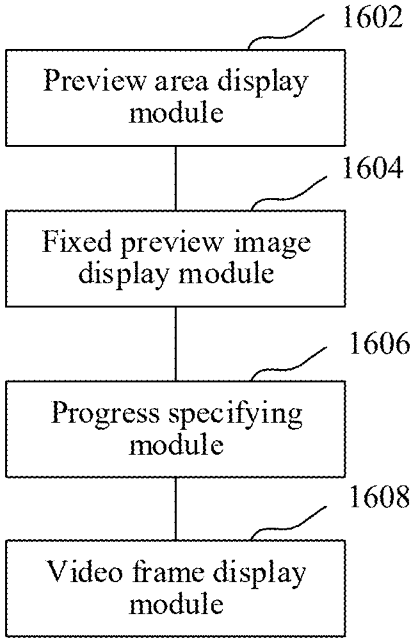
FIG. 16 is a structural block diagram of a video preview interaction apparatus according to an embodiment of the present disclosure.

In an embodiment, as shown in FIG. 16, a video preview interaction apparatus is provided, including: a preview area display module 1602, a fixed preview image display module 1604, a progress specifying module 1606, and a video frame display module 1608.

The preview area display module 1602 is configured to display a preview control area and a preview display area of a video in response to a preview triggering event for the video.

The fixed preview image display module 1604 is configured to arrange and display, in the preview control area, a plurality of fixed preview images that are from the video and are spaced away from each other according to timing in a corresponding progress time range in the video.

The progress specifying module 1606 is configured to mark, in response to specifying of preview progress of the preview control area in a fixed preview image specified by the preview progress in the preview control area, a progress location specified by the preview progress within a corresponding progress time interval of the specified fixed preview image in the video.

The video frame display module 1608, is configured to display, in the preview display area, a video frame preview image of a video frame corresponding to the progress time indicated by the progress location in the video.

According to the foregoing video preview interaction apparatus, in response to a preview triggering event for a video, a preview control area and a preview display area of the video are displayed. In the preview control area, a plurality of fixed preview images spaced from the video are arranged and displayed according to timing in a corresponding progress time range in the video, so that video frame extraction can be guided by using the plurality of fixed preview images, to quickly and accurately locate a video frame to be extracted. In response to specifying of preview progress of the preview control area, in the fixed preview images specified by the preview progress in the preview control area, the progress location specified by the preview progress within a corresponding progress time interval of the specified fixed preview image in the video is marked, so that video frame extraction can be quickly positioned and instructed. Further, the video frame preview image of the video frame that corresponds to the progress time indicated by the progress location in the video may be displayed in the preview display area, thereby implementing quick and smooth video frame extraction.

In an embodiment, the progress specifying module is further configured to display a preview progress indicator in the preview control area, where the preview progress indicator is used for performing specifying of preview progress in the preview control area, and display, in response to a moving operation for the preview progress indicator, the preview progress indicator moving along an arranged track of the plurality of fixed preview images. A location of the preview progress indicator in the preview control area is configured for marking a progress location specified by the preview progress.

In an embodiment, the video preview interaction apparatus further includes a video cover display module. The video cover display module is configured to highlight, in the preview display area in response to a cover capture operation for the video frame preview image, at least part of the video frame preview image indicated by the cover capture operation, and display, in response to a cover setting operation for the video, the at least part of the highlighted video frame preview image indicated by the cover capture operation as a video cover of the video.

In an embodiment, the video cover display module is further configured to display a cover capture area in the preview display area, where the cover capture area displays the at least part of the video frame preview image, display, in response to the cover capture operation for the video frame preview image, a cover capture area that changes according to an area adjustment mode indicated by the cover capture operation, and display, in the cover capture area, the at least the part of the cover capture area captured from the video frame preview image.

In an embodiment, the preview area display module is further configured to display an initial video cover and a cover editing entrance of the video in response to the uploading operation for the video when the video is locally cached to a local database, and trigger a preview triggering event for the video in response to a triggering operation for the cover editing entrance.

In an embodiment, in the plurality of video frames corresponding to the plurality of fixed preview images in the video, a time interval between every two neighboring video frames is equal; and every two neighboring fixed preview images of the plurality of rectangular fixed preview images arranged along a preset arrangement direction in the preview control area are connected through side lengths, and a direction of the side length is perpendicular to the preset arrangement direction.

Various modules in the foregoing video frame extraction apparatus and video preview interaction apparatus may be entirely or partially implemented through software, hardware, or a combination thereof. Each of the above modules may be embedded in or independent of a processor in a computer device, or may be stored in a memory in the computer device in a software form, so that the processor invokes operations corresponding to the above modules.

In an embodiment, a computer device is provided. The computer device may be a terminal, or may be a server. Using an example in which the computer device is a terminal, an internal structure of the computer device may be shown in FIG. 17. The computer device includes a processor, a memory, an input/output interface, a communication interface, a display unit, and an input apparatus. The processor, the memory, and the input/output interface are connected with each other through a system bus. The communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and a computer program. The inner memory provides an operating environment for the operating system and the computer program in the non-volatile storage medium. The input/output interface of the computer device is configured to exchange information between the processor and an external device. The communication interface of the computer device is configured to communicate with an external terminal in a wired or wireless mode. The wireless mode may be implemented through WIFI, a mobile cellular network, near field communication (NFC), or another technology. The computer program implements a video frame extraction method or a video preview interaction method when executed by the processor. The display unit of the computer device is configured to form a visible picture, and may be a display screen, a projection apparatus, or a virtual reality imaging apparatus. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, mouse, or the like.

Figure 17:
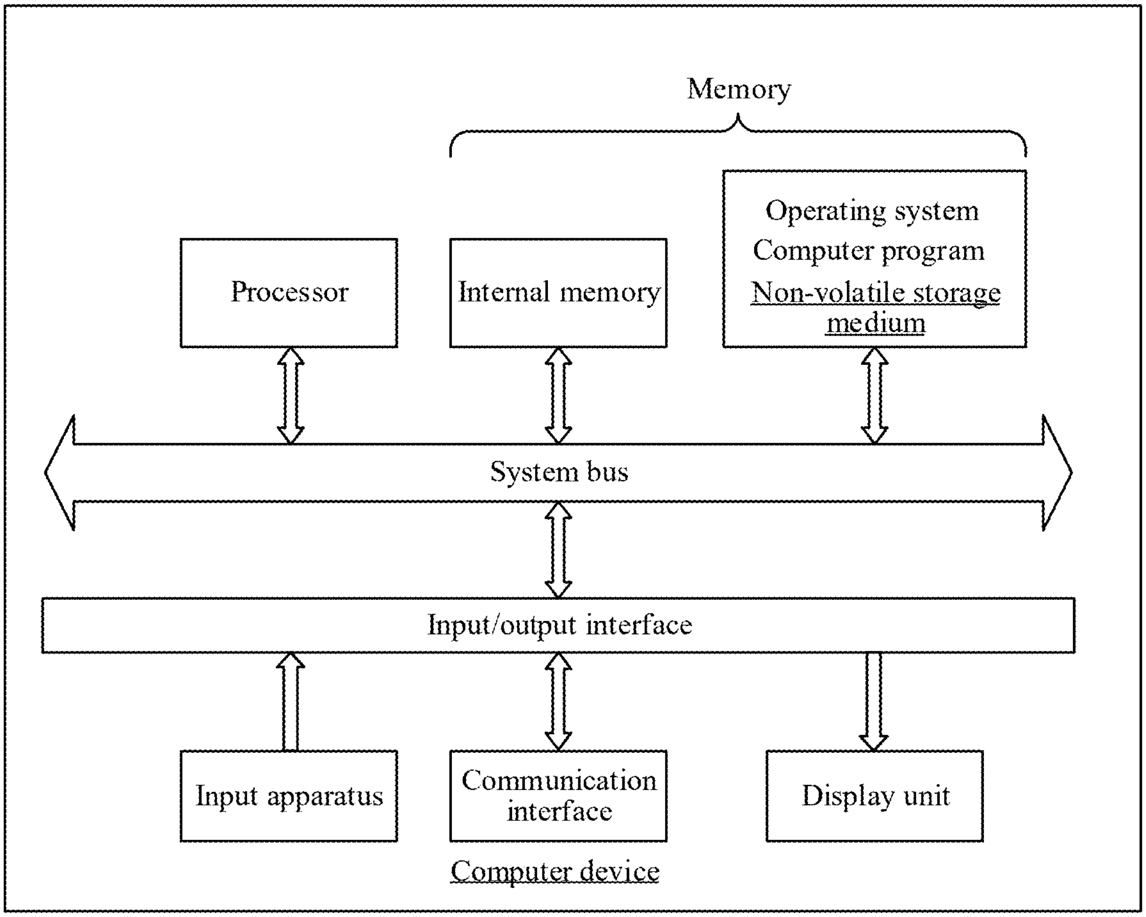
FIG. 17 is a diagram of an internal structure of a computer device according to an embodiment of the present disclosure.

It will be understood by those skilled in the art that the structure shown in FIG. 17 is only a block diagram of a part of the structure related to the solution of the present disclosure, and does not constitute a limitation of the computer device to which the solution of the present disclosure is applied. The specific computer device may include more or fewer components than those shown in the figures, or combine some components, or have different component arrangements.

In an embodiment, a computer device is further provided, including a memory and a processor. The memory stores a computer program. The processor implements operations in various method embodiments described above when executing the computer program.

In an embodiment, a computer-readable storage medium is provided, having a computer program stored therein. The computer program implements operations in various method embodiments described above when executed by a processor.

In an embodiment, a computer program product is provided, including a computer program. The computer program implements operations in various method embodiments described above when executed by a processor.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a database, or another medium used in various embodiments provided in the present disclosure may include at least one of a non-volatile or volatile memory. The non-volatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory. As an illustration rather than a limitation, the RAM is available in various forms, such as a static random access memory (SRAM) or a dynamic random access memory (DRAM). The database involved in various embodiments provided by the present disclosure may include at least one of a relational database and a non-relational database. The non-relational database may include, but is not limited to, a blockchain-based distributed database, and the like. The processor involved in various embodiments provided by the present disclosure may be, but is not limited to, a general-purpose processor, a central processing unit, a graphics processing unit, a digital signal processor, a programmable logic device, a quantum computing-based data processing logic device, and the like.

Technical features of the foregoing embodiments may be combined in different manners to form other embodiments encompassed within the scope of the present disclosure.

The foregoing embodiments only describe several implementations of the present disclosure, which are described specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A video frame extraction method, the method comprising:

uploading, by a computer device, a video through an online access link;

locally caching, by the computer device, the video to a local database when the video corresponding to a local video identifier does not exist in the local database, wherein the uploading of the video and locally caching the video comprises:

retrieving video information of the video from a storage device;

in response to determining, according to the video information, that a video format of the video does not satisfy a video caching condition, transcoding, by starting a web worker thread executed on the computer device, the video to obtain a transcoded video, the video format of the transcoded video satisfying the video caching condition; and locally caching the transcoded video to the local database;

generating, by the computer device, a local access link of the video based on the transcoded video and according to the online access link, the local access link comprising a local cache identifier and the local video identifier pointing to the video cached in the local database;

in response to a video frame extraction request received from a device for the video, extracting a playback time of target video frame of the video for extracting and triggering an access request by starting a service worker thread, the access request instructing to access the local access link and carrying the playback time of target video frame;

forwarding the access request to the local database in response to identifying the local cache identifier from the local access link instructed by the access request to access, to enable the local database to return, in response to the access request, a locally cached video that matches based on the local video identifier; and receiving the locally cached video returned by the local database and extracting a video frame matching the playback time of target video frame from the locally cached video to set operation for the extracted video frame.

2. The method according to claim 1, wherein generating the local access link of the video according to the online access link comprises:

obtaining the local cache identifier, the local video identifier of the video, and a link parameter of the online access link; and generating the local access link of the video according to the local cache identifier, the local video identifier, and the link parameter.

3. The method according to claim 1, further comprising:

the service worker thread being configured for intercepting and identifying the access request; and forwarding the access request to the local database in response to identifying the local cache identifier from the local access link instructed by the access request to access comprises:

forwarding, by the service worker thread, the access request to the local database in response to identifying the local cache identifier from the local access link instructed by the access request to access.

4. The method according to claim 1, further comprising:

loading a video transcoding tool through the web worker thread; and transcoding the video to obtain the transcoded video comprises:

transcoding the video through the video transcoding tool to obtain the transcoded video in response to determining, according to the video information, that the video format of the video does not satisfy the video caching condition.

5. The method according to claim 1, wherein uploading the video through an online access link, and locally caching the video to the local database comprises:

uploading the video through the online access link, generating the local video identifier of the video, and triggering a video query request carrying the local video identifier to the local database; and caching the video to the local database when a cached video corresponding to the local video identifier does not exist in the local database.

6. The method according to claim 1, further comprising:

associating and locally caching the extracted video frame and the playback time of target video frame to the local database;

obtaining, in response to a video frame re-extraction request of the video, a video frame re-extraction time of the video, and triggering a video frame query request carrying the video frame re-extraction time to the local database; and obtaining the cached video frame returned by the local database in response to the video frame query request when a cached video frame matching the video frame re-extraction time exists in the local database.

7. The method according to claim 1, further comprising:

using the extracted video frame as a video cover of the video in response to a video cover setting operation for the extracted video frame; and publishing the video to a video platform based on a content delivery network (CDN) link of the video in response to a publishing operation for the video, the CDN link being generated by a video platform server that caches the video.

8. The method according to claim 7, further comprising:

obtaining a cover video frame time of the video in response to a video cover modification event for the video, and triggering an obtaining request that instructs to access the CDN link of the video and carries the cover video frame time to the video platform server;

obtaining a background cached video returned by the video platform server in response to the obtaining request, and extracting a modified cover frame from the background cached video, the modified cover frame matching the cover video frame time; and updating the modified cover frame to the video cover of the video.

9. A computer device, comprising:

one or more processors and a memory containing a computer program that, when being executed, causes the one or more processors to perform:

uploading a video through an online access link;

locally caching the video to a local database when the video corresponding to a local video identifier does not exist in the local database, wherein the uploading of the video and locally caching the video comprises:

retrieving video information of the video from a storage device;

in response to determining, according to the video information, that a video format of the video does not satisfy a video caching condition, transcoding, by starting a web worker thread executed on the computer device, the video to obtain a transcoded video, the video format of the transcoded video satisfying the video caching condition; and locally caching the transcoded video to the local database;

generating a local access link of the video based on the transcoded video and according to the online access link, the local access link comprising a local cache identifier and the local video identifier pointing to the video cached in the local database;

in response to a video frame extraction request received from a device for the video, extracting a playback time of target video frame of the video for extracting and triggering an access request by starting a service worker thread, the access request instructing to access the local access link and carrying the playback time of target video frame;

forwarding the access request to the local database in response to identifying the local cache identifier from the local access link instructed by the access request to access, to enable the local database to return, in response to the access request, a locally cached video that matches based on the local video identifier; and receiving the locally cached video returned by the local database and extracting a video frame matching the playback time of target video frame from the locally cached video to set operation for the extracted video frame.

10. The device according to claim 9, wherein the one or more processors are further configured to perform:

obtaining the local cache identifier, the local video identifier of the video, and a link parameter of the online access link; and generating the local access link of the video according to the local cache identifier, the local video identifier, and the link parameter.

11. The device according to claim 9, wherein the one or more processors are further configured to perform:

starting a service worker thread, the service worker thread being configured for intercepting and identifying the access request; and forwarding, by the service worker thread, the access request to the local database in response to identifying the local cache identifier from the local access link instructed by the access request to access.

12. The device according to claim 9, wherein the one or more processors are further configured to perform:

loading a video transcoding tool through the web worker thread; and transcoding the video through the video transcoding tool to obtain the transcoded video in response to determining, according to the video information, that the video format of the video does not satisfy the video caching condition.

13. The device according to claim 9, wherein the one or more processors are further configured to perform:

uploading the video through the online access link, generating the local video identifier of the video, and triggering a video query request carrying the local video identifier to the local database.

14. The device according to claim 9, wherein the one or more processors are further configured to perform:

associating and locally caching the extracted video frame and the playback time of target video frame to the local database;

obtaining, in response to a video frame re-extraction request of the video, a video frame re-extraction time of the video, and triggering a video frame query request carrying the video frame re-extraction time to the local database; and obtaining the cached video frame returned by the local database in response to the video frame query request when a cached video frame matching the video frame re-extraction time exists in the local database.

15. The device according to claim 9, wherein the one or more processors are further configured to perform:

using the extracted video frame as a video cover of the video in response to a video cover setting operation for the extracted video frame; and publishing the video to a video platform based on a content delivery network (CDN) link of the video in response to a publishing operation for the video, the CDN link being generated by a video platform server that caches the video.

16. The device according to claim 15, wherein the one or more processors are further configured to perform:

obtaining a cover video frame time of the video in response to a video cover modification event for the video, and triggering an obtaining request that instructs to access the CDN link of the video and carries the cover video frame time to the video platform server;

obtaining a background cached video returned by the video platform server in response to the obtaining request, and extracting a modified cover frame from the background cached video, the modified cover frame matching the cover video frame time; and updating the modified cover frame to the video cover of the video.

17. A non-transitory computer-readable storage medium containing a computer program that, when being executed, causes at least one processor of a computer device to perform:

uploading a video through an online access link;

locally caching the video to a local database when the video corresponding to a local video identifier does not exist in the local database, wherein the uploading of the video and locally caching the video comprises:

retrieving video information of the video from a storage device;

in response to determining, according to the video information, that a video format of the video does not satisfy a video caching condition, transcoding, by starting a web worker thread executed on the computer device, the video to obtain a transcoded video, the video format of the transcoded video satisfying the video caching condition; and locally caching the transcoded video to the local database;

generating a local access link of the video based on the transcoded video and according to the online access link, the local access link comprising a local cache identifier and the local video identifier pointing to the video cached in the local database;

in response to a video frame extraction request received from a device for the video, extracting a playback time of target video frame of the video for extracting and triggering an access request by starting a service worker thread executed on the computing device, the access request instructing to access the local access link and carrying the playback time of target video frame;

forwarding the access request to the local database in response to identifying the local cache identifier from the local access link instructed by the access request to access, to enable the local database to return, in response to the access request, a locally cached video that matches based on the local video identifier; and receiving the locally cached video returned by the local database and extracting a video frame matching the playback time of target video frame from the locally cached video to set operation for the extracted video frame.

18. The non-transitory computer-readable storage medium according to claim 17, wherein the computer program further causes the at least one processor is further configured to perform:

obtaining the local cache identifier, the local video identifier of the video, and a link parameter of the online access link; and generating the local access link of the video according to the local cache identifier, the local video identifier, and the link parameter.

* * * * *